US007944439B2

(12) United States Patent
Mamba et al.

(10) Patent No.: US 7,944,439 B2
(45) Date of Patent: May 17, 2011

(54) DISPLAY DEVICE

(75) Inventors: Norio Mamba, Kawasaki (JP); Yasuyuki Kudo, Fujisawa (JP); Toshio Miyazawa, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 1378 days.

(21) Appl. No.: 11/448,989

(22) Filed: Jun. 8, 2006

(65) Prior Publication Data

US 2007/0040825 A1 Feb. 22, 2007

(30) Foreign Application Priority Data

Aug. 22, 2005 (JP) ................................ 2005-239396

(51) Int. Cl.
*G06F 3/038* (2006.01)
*G09G 3/36* (2006.01)

(52) U.S. Cl. ............ 345/211; 345/92; 345/99; 345/212

(58) Field of Classification Search .................... 345/87, 345/98–100, 211–212; 327/535–536
See application file for complete search history.

(56) References Cited

U.S. PATENT DOCUMENTS 5,559,402 A * 9/1996 Corrigan, III .............. 315/169.3
6,123,092 A * 9/2000 Torii ................................ 137/1
7,005,838 B2 * 2/2006 Tobita ........................... 323/314
7,148,886 B2 * 12/2006 Nakajima ..................... 345/211
7,205,989 B2 * 4/2007 Nakajima ..................... 345/211
7,336,273 B2 * 2/2008 Nakajima ..................... 345/211
7,528,828 B2 * 5/2009 Nakajima ..................... 345/211
2005/0212791 A1 * 9/2005 Tsuchi .......................... 345/211

FOREIGN PATENT DOCUMENTS

JP 2002-291231 10/2002
JP 2003-23770 1/2003
JP 2003023770 A * 1/2003

* cited by examiner

*Primary Examiner* — Bipin Shalwala
*Assistant Examiner* — Sosina Abebe
(74) *Attorney, Agent, or Firm* — McDermott Will & Emery LLP

(57) ABSTRACT

A display device includes first and second voltage generation circuits each including a voltage circuit for outputting an internal voltage on the basis of a plurality of clocks, a sampling circuit for sampling an output signal from the voltage circuit, a monitoring circuit for comparing an output signal from the first sampling circuit with a predetermined voltage range and outputting a result, and a power supply generation circuit for generating a power supply voltage to be input to the voltage circuit on the basis of an output signal supplied from the monitoring circuit. The voltage circuit in the first voltage generation circuit is controlled on the basis of a level of the power supply voltage, and the voltage circuit in the second voltage generation circuit is controlled on the basis of periods of the clocks.

16 Claims, 12 Drawing Sheets

DISPLAY DEVICE

INCORPORATION BY REFERENCE

The present application claims priority from Japanese application serial No. 2005-239396 filed on Aug. 22, 2005, the content of which is hereby incorporated by reference into this application.

BACKGROUND OF THE INVENTION

The present invention relates, in particular, to a display device of active matrix type having a charge pump booster circuit formed on a substrate surface of a display panel.

Portable devices such as portable telephones and digital still cameras are driven by batteries. These portable devices include devices that need a voltage higher than the battery voltage. Therefore, a high voltage is generated by a booster circuit in the devices.

In general, a charge pump booster circuit is used when a consumed current of a device requiring a high voltage is small.

A small-sized liquid crystal display device included in a potable device typically needs a voltage higher than the battery voltage or a voltage of negative polarity. For a voltage corresponding to a small current consumption, the above-described charge pump booster circuit is used.

For obtaining a high voltage, a charge pump voltage doubling booster circuit is used. For obtaining a potential of negative polarity, a charge pump inversion booster circuit is used.

In general, the charge pump booster circuit includes stabilizing capacitance for stabilizing output potential, pumping capacitance for storing charge on the stabilizing capacitance (pulling charge out from the stabilizing capacitance), and a plurality of switching elements for controlling the stabilizing capacitance and the pumping capacitance.

The charge pump booster circuit conducts driving by repeating two time periods (for example, A and B). In the case of the voltage doubling booster circuit, a first terminal of the pumping capacitance is connected to an input voltage VCC and a second terminal of the pumping capacitance is connected to GND for the time period A. Subsequently, for the time period B, the first terminal of the pumping capacitance is electrically disconnected from VCC, and then the second terminal of the pumping capacitance is connected to VCC. As a result, a potential at the first terminal of the pumping capacitance becomes twice as high as VCC. In this state, the first terminal of the pumping capacitance is connected to the stabilizing capacitance to store charge on the stabilizing capacitance. Thereafter, the first terminal of the pumping capacitance is electrically disconnected from the stabilizing capacitance, and then the time period A is repeated.

By thus repeating the time periods A and B, charge is stored on the stabilizing capacitance and ideally it is possible to obtain an output voltage twice as high as VCC.

In the case of the inversion booster circuit, a first terminal of pumping capacitance is connected to GND and a second terminal of the pumping capacitance is connected to VCC in a time period A. Subsequently, in a time period B, the first terminal of the pumping capacitance is electrically disconnected from GND, and then the second terminal of the pumping capacitance is connected to GND. As a result, a potential at the first terminal of the pumping capacitance becomes −1 time as high as VCC. In this state, the first terminal of the pumping capacitance is connected to the stabilizing capacitance to pull out charge from the stabilizing capacitance.

Thereafter, the first terminal of the pumping capacitance is electrically disconnected from the stabilizing capacitance, and then the time period A is repeated. By thus repeating the time periods A and B, charge is pulled out from the stabilizing capacitance and ideally it is possible to obtain an output voltage that is −1 time (inverted) as high as VCC.

For increasing an output current of such a charge pump booster circuit, it can be coped with by raising the repetition frequency of the time period A and the time period B and using large pumping capacitance.

In JP-A-2002-291231, a circuit configuration in the case where the charge pump booster circuit is used in a liquid crystal display device is disclosed. In general, the current consumption changes largely according to the display state in liquid crystal display devices. Therefore, an application example of the charge pump booster circuit described in JP-A-2002-291231 has a feature that it estimates a current consumption in the liquid crystal display device and optimally adjust an operation frequency (the number of times of repetition of the time period A and the time period B) of the charge pump booster circuit by monitoring an output voltage of the charge pump booster circuit. As a result, a power supply circuit that can reduce the power consumption loss at ordinary times when the current consumption is low while coping with a maximum current consumption in a specific display pattern is implemented.

A switched capacitor stabilized power supply apparatus described in JP-A-2003-23770 includes a booster circuit including pumping capacitance C1 and switching elements SW1 to SW4. Charging and discharging the pumping capacitance C1 is changed over by switching operation of switching elements SW1 to SW4. At the time of discharging the pumping capacitance C1, a DC voltage Vin applied to an input terminal IN is boosted and output. In this switched capacitor stabilized power supply apparatus, the DC voltage Vin is divided by resistors R1 and R2 to monitor the output voltage Vin.

SUMMARY OF THE INVENTION

Voltages required to drive active matrix liquid crystal display devices intended for portable devices include a gate voltage for controlling a scanning line, a common voltage applied to common electrodes of pixels, and signal voltages which are voltages corresponding to a display signal.

Among them, the signal voltages required to have highly precise voltage levels because of demands for a larger number of gradations and a higher picture quality are generated by an LSI in many cases. Typically, in this case, a low voltage side level of the signal voltages becomes nearly GND. A high voltage side level becomes approximately 4 V although it depends upon characteristics of the liquid crystal (for example, in the case where the potential at the common electrode is alternated).

As for the gate voltage, two voltages: a selection level and a non-selection level become necessary. As for the selection level, a voltage (for example, 10 V) higher than the signal voltages is required to turn on a switching element included in a pixel of the liquid crystal display device. As for the non-selection level, a sufficiently low voltage (for example, −5 V) is required for a pixel having a signal voltage written therein to retain the signal.

As for the common voltage as well, two levels are required in the case where AC driving is conducted. Supposing the threshold voltage of the liquid crystal to be approximately 1 V, a level of approximately 5 V is required on the high potential side and a level of approximately −1 V is required on the low potential side. In general, if the withstand voltage of an LSI becomes high, its chip area becomes large and its material cost becomes high.

In the case of a liquid crystal display device using low temperature polysilicon TFTs (thin film transistors) as pixel TFTs, therefore, the LSI is provided with a withstand voltage of approximately 6 V and the signal voltages (and the high voltage of the common voltage) are generated. High voltages exceeding 6 V, such as the gate voltages, and low voltages of GND or below are generated by a charge pump booster part (power supply part) formed on the same glass substrate as a display area by the switching elements such as low temperature polysilicon TFTs. As a result, a system of a liquid crystal display device can be constructed without raising the withstand voltage of the LSI.

In the case where a voltage exceeding an LSI withstand voltage is generated on a glass substrate as described above, however, an output voltage of the power supply part (charge pump booster part) cannot be fed back to the LSI and control of the power supply part according to the current consumption of the liquid crystal display device as described in BACKGROUND OF THE INVENTION cannot be exercised.

Furthermore, the output voltage of the power supply part on the glass substrate cannot be monitored. Even if the output voltage is changed by a load variation, therefore, the output voltage cannot be adjusted.

An object of the present invention is to provide a display device including a power supply part capable of monitoring the output state of the charge pump booster part formed on the glass substrate of the display panel and controlling the output voltage according to the load state.

Another object of the present invention is provide a display device capable of controlling the output voltage according to the load state even when the output voltage of the charge pump booster circuit formed on the glass substrate exceeds the withstand voltage of the monitored LSI.

In a display device according to the present invention, a booster (16 (17)) includes a plurality of switches as shown in, for example, FIGS. 1 and 2. A first input voltage (Vin_h or Vin_l) is connected to a first terminal of a first switch (SW1). A second terminal of the first switch is connected to the first terminal of pumping capacitance (Cp) and a first terminal of a second switch (SW2). A second input voltage (VL or VH) is input to a first terminal of a third switch (SW3), and a second terminal of the third switch is connected to a second terminal of the pumping capacitance and a first terminal of a fourth switch (SW4). A third input voltage (VH or VL) is input to a second terminal of the fourth switch. A second terminal of the second switch forms an output terminal of the booster. The first switch is controlled to assume an on-state or an off-state by a first input signal (ck1_h or ck1_l). The second switch is controlled to assume an on-state or an off-state by a second input signal (ck2_h or ck2_l). The third switch is controlled to assume an on-state or an off-state by a third input signal (ck3_h or ck3_l). The fourth switch is controlled to assume an on-state or an off-state by a fourth input signal (ck4_h or ck4_l). The display device including the booster and the pumping capacitance includes a sampler (18(19)) for sampling a voltage signal at the first terminal of the pumping capacitance during a time period determined by a fifth input signal (cksp_h), an output monitor (6, (9)) for comparing an output signal from the sampler with a voltage range determined by an output condition of the booster, a controller (3) for generating the first input signal, the second input signal, the third input signal and the fourth input signal of the booster and the fifth input signal of the sampler, and an internal power supply generator (2) for generating the first input voltage, the second input voltage and the third input voltage of the booster.

According to the present invention, it becomes possible in the case where the charge pump booster is incorporated in the display panel to control the output of the incorporated booster in the externally installed drive circuit.

As a result, it becomes possible to improve the output voltage precision of the boosters incorporated in the display panel. Therefore, the boosters can be used for the drive voltage source that affects the picture quality, such as a reference potential of a signal voltage or a common electrode voltage. Furthermore, it becomes possible to incorporate a power supply that has been incorporated in an external LSI until then into the display panel. Consequently, an effect of reducing the cost of the display device can be anticipated. In addition, it becomes possible to reduce the power consumption in the booster by controlling the drive of the booster according to the load state (power consumption state).

The present invention can be applied to general display devices, such as liquid crystal devices and organic EL display devices, in which thin film elements such as transistors and diodes in a peripheral circuit are formed of silicon close to polysilicon or single crystal silicon having higher charge mobility than amorphous silicon.

Other objects, features and advantages of the invention will become apparent from the following description of the embodiments of the invention taken in conjunction with the accompanying drawings.

DESCRIPTION OF THE EMBODIMENTS

First Embodiment

Figure 1:
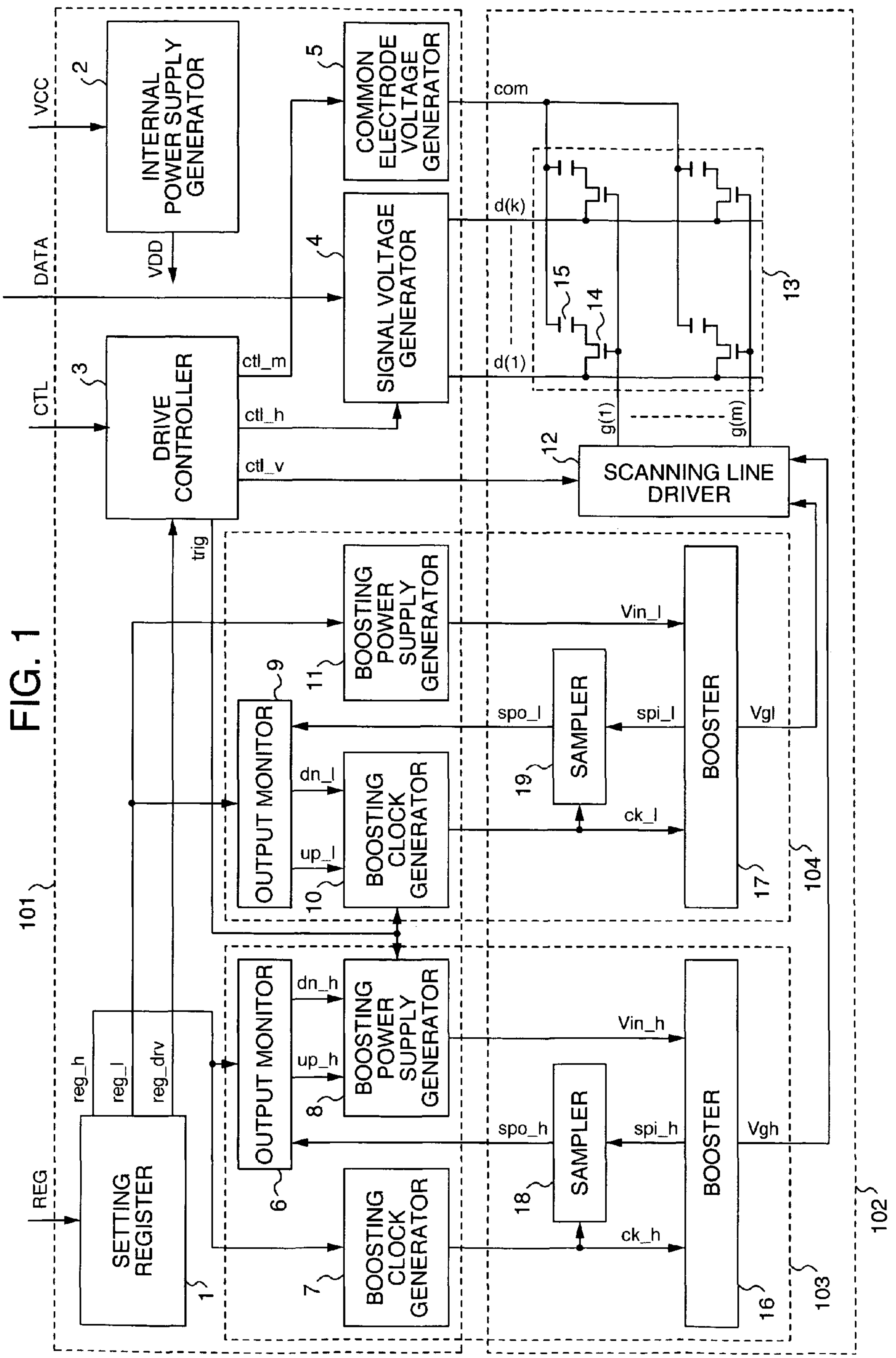
FIG. 1 is a schematic diagram of a liquid crystal display device according to a first embodiment of the present invention.

FIG. 1 is a schematic general configuration diagram of a liquid crystal display device according to the present embodiment. As shown in FIG. 1, the liquid crystal display device according to the present embodiment mainly includes a drive circuit 101 and a display panel 102. Within the drive circuit 101 and the display panel 102, a gate selection voltage generator 103 serving as a first output voltage generator and a gate non-selection voltage generator 104 serving as a second output voltage generator are included.

The drive circuit 101 receives a signal from the outside, generates signal voltages, a control signal and power supply voltage required to drive the liquid crystal panel 102, and supplies them to the liquid crystal panel 102. In addition, the drive circuit 101 receives internal voltage signals, which make it possible to monitor output situations of power supplies 16 and 17 (hereafter referred to as "boosters") included in the liquid crystal panel 102, and controls outputs of the boosters 16 and 17.

On the other hand, the liquid crystal panel 102 conducts display on the basis of the power supply voltage generated by the internal boosters 16 and 17 and the signal voltages and the control signal output by the drive circuit 101.

In the present embodiment, there are no restrictions in kinds of drive circuits incorporated in the liquid crystal panel 102 and kinds of voltages generated by the boosters. As an example, the case where the drive circuit included in the liquid crystal panel 102 is a scanning line driver 12 and voltages generated by the boosters incorporated in the liquid crystal panel 102 are two voltages, i.e., a gate selection voltage Vgh and a gate non-selection voltage Vgl needed by the scanning line driver 12 will now be described.

First, a configuration of the drive circuit 101 will now be described. The drive circuit 101 includes a setting register 1 for storing a drive condition, an internal power supply generator 2 for generating a power supply for circuits included in the drive circuit 101, a drive controller 3 for controlling drive of the circuits and the liquid crystal panel 102, a signal voltage generator 4 for generating signal voltages according to data to be displayed on the liquid crystal display device, a common electrode voltage generator 5 for generating a common electrode voltage to be applied to a common electrode of the liquid crystal panel 102, output monitors 6 and 9 for monitoring output states of the boosters included in the liquid crystal panel 102, boosting clock generators 7 and 10 for generating boosting clocks of the boosters, and boosting power supply generators 8 and 11 for generating input power supplies of the boosters.

Hereafter, respective circuits will be described. The setting register 1 stores a setting signal REG input from the outside, and outputs setting information to respective circuits. For example, the setting register 1 outputs a drive setting signal reg_drv such as a drive period and timing of respective circuits to the drive controller 3. Furthermore, the setting register 1 outputs a Vgh setting signal reg_h containing information such as an output voltage value and an allowable output voltage range of the gate selection voltage Vgh to the output monitor 6, the boosting clock generator 7 and the boosting power supply generator 8, which are circuits for controlling the Vgh booster 16. In addition, the setting register 1 outputs a, Vgl setting signal reg_l containing information such as an output voltage value and an allowable output voltage range of the gate non-selection voltage Vgl to the output monitor 9, the boosting clock generator 10 and the boosting power supply generator 11, which are circuits for controlling the Vgl booster 17.

The internal power supply generator 2 generates an internal power supply VDD (VH, VL) required to drive respective circuits, from a system power supply VCC input from the outside, and outputs the internal power supply VDD (VH, VL). By the way, it matters little even if VDD is used as a drive voltage of the liquid crystal panel.

On the basis of a control signal CTL input from the outside, the drive controller 3 outputs a control signal ctl_h of the signal voltage generator 4, a control signal ctl_m of the common electrode voltage generator 5, a control signal ctl_v of the scanning line driver 12, and a control signal trig for monitoring outputs of the boosters incorporated in the liquid crystal panel 102. The control signal trig is input to the boosting power supply generator 8 for Vgh and the boosting clock generator 10 for Vgl.

The signal voltage generator 4 generates signal voltages on the basis of the control signal ctl_h and display data DATA input from the outside, and outputs the signal voltages to signal lines d(1) to d(k).

The common electrode voltage generator 5 generates the common electrode voltage on the basis of the control signal ctl_m, and outputs the common electrode voltage to a common signal electrode line com of the liquid crystal panel 102.

The boosting clock generator 7 for Vgh generates and outputs a boosting clock ck_h of the booster for Vgh. The output monitor 6 for Vgh receives an output monitoring signal spo_h and outputs monitoring result signals up_h and dn_h.

The boosting power supply generator 8 for Vgh receives the monitoring result signals up_h and dn_h from the output monitor 6, and generates and outputs a Vgh power supply Vin_h according to timing of the control signal trig. Respective circuits for Vgh operate on the basis of the setting signal reg_h as described earlier.

The boosting power supply generator 11 for Vgl generates and outputs a Vgl power supply Vin_l.

The output monitor 9 for Vgl receives an output monitoring signal spo_l and outputs monitoring result signals up_l and dn_l.

The boosting clock generator 10 for Vgl receives the monitoring result signals up_l and dn_l from the output monitor 9, and generates and outputs a boosting clock ck_l for Vgl according to timing of the control signal trig. Respective circuits for Vgl operate on the basis of the setting signal reg_l as described earlier.

A configuration of the liquid crystal panel 102 will now be described. Ordinary, the liquid crystal panel includes two transparent substrates, and a liquid crystal layer, a color filter and a sheet polarizer interposed between the substrates.

The liquid crystal panel 102 shown in FIG. 1 indicates a schematic circuit configuration on a transparent substrate (for example, a glass substrate) in which a display 13 is formed.

The liquid crystal panel 102 includes the scanning line driver 12, the display 13, the charge pump booster 16 for Vgh, the charge pump booster 17 for Vgl, the sampler 18 for Vgh, and the sampler 19 for Vgl.

The display 13 includes k signal lines d ranging from d(1) to d(k) in the horizontal direction, m signal lines g ranging from g(1) to g(m) in the vertical direction, switching elements 14 respectively disposed near intersections of the signal lines d and the scanning lines g, pixel electrodes (not illustrated) for applying signal voltages supplied via the switching elements to liquid crystal 15, and a common signal electrode line corn serving as the other electrode of the liquid crystal 15.

FIG. 1 shows the case where the common signal electrode line com and the switching elements 14 are on the same substrate. However, the common signal electrode line is not restricted to this, but may be disposed on the other transparent substrate.

The scanning line driver 12 outputs a scanning line drive signal to scanning lines g(1) to g(m) on the basis of the control signal ctl_v output from the drive circuit 101 and the gate selection voltage Vgh and the gate non-selection voltage Vgl supplied respectively from the boosters 16 and 17 incorporated in the liquid crystal panel 102.

If the gate selection voltage Vgh is applied to the scanning lines g(1) to g(m) by the scanning line driver 12, then the switching element 14 turns on and signal voltages output by the drive circuit 101 are applied to pixel electrodes. As a result, a display voltage depending upon the potential difference between the common signal voltage and the signal voltage is applied to the liquid crystal 15. If the gate non-selection voltage Vgl is applied by the scanning line driver 12 thereafter, then the switching element 14 turns off and a display voltage corresponding to display data is retained in the liquid crystal 15. By thus repeating the drive operation from the scanning line g(1) to g(m), an image corresponding to display data can be displayed on the liquid crystal display device.

On the other hand, the charge pump booster 16 for Vgh generates the gate selection voltage Vgh on the basis of the boosting clock ck_h output from the boosting clock generator 7 and the boosting power supply voltage Vin_h, and outputs the gate selection voltage Vgh to the scanning line driver 12. At this time, the sampler 18 for Vgh samples an internal voltage spi_h of the Vgh booster 16 on the basis of the boosting clock ck_h, and outputs a result to the output monitor 6 as the output monitoring signal spo_h for Vgh.

Furthermore, the charge pump booster 17 for Vgl generates the gate non-selection voltage Vgl on the basis of the boosting clock ck_l output from the boosting clock generator 10 and the boosting power supply voltage Vin_l, and outputs the gate non-selection voltage Vgl to the scanning line driver 12. At this time, the sampler 19 for Vgl samples an internal voltage spi_l of the Vgl booster 17 on the basis of the boosting clock ck_l, and outputs a result to the output monitor 9 as the output monitoring signal spo_l for Vgl.

Supposing that the gate selection voltage Vgh is a potential of positive polarity that can be coped with by the voltage doubling charge pump booster 16 and the gate non-selection voltage Vgl is a potential of negative polarity that can be coped with by the voltage inverting charge pump booster 17, description will be continued. However, the potentials of Vgh and Vgl are not restricted to these potentials.

According to a feature in the present embodiment, drive control according to the situation of the output (situation of the driven load) of the charge pump booster is exercised by monitoring the internal voltage of the booster instead of monitoring the output voltage, when controlling the drive of the charge pump booster.

Hereafter, the control method of the charge pump booster will be described with reference to FIGS. 2-7A-7C.

Figure 2:
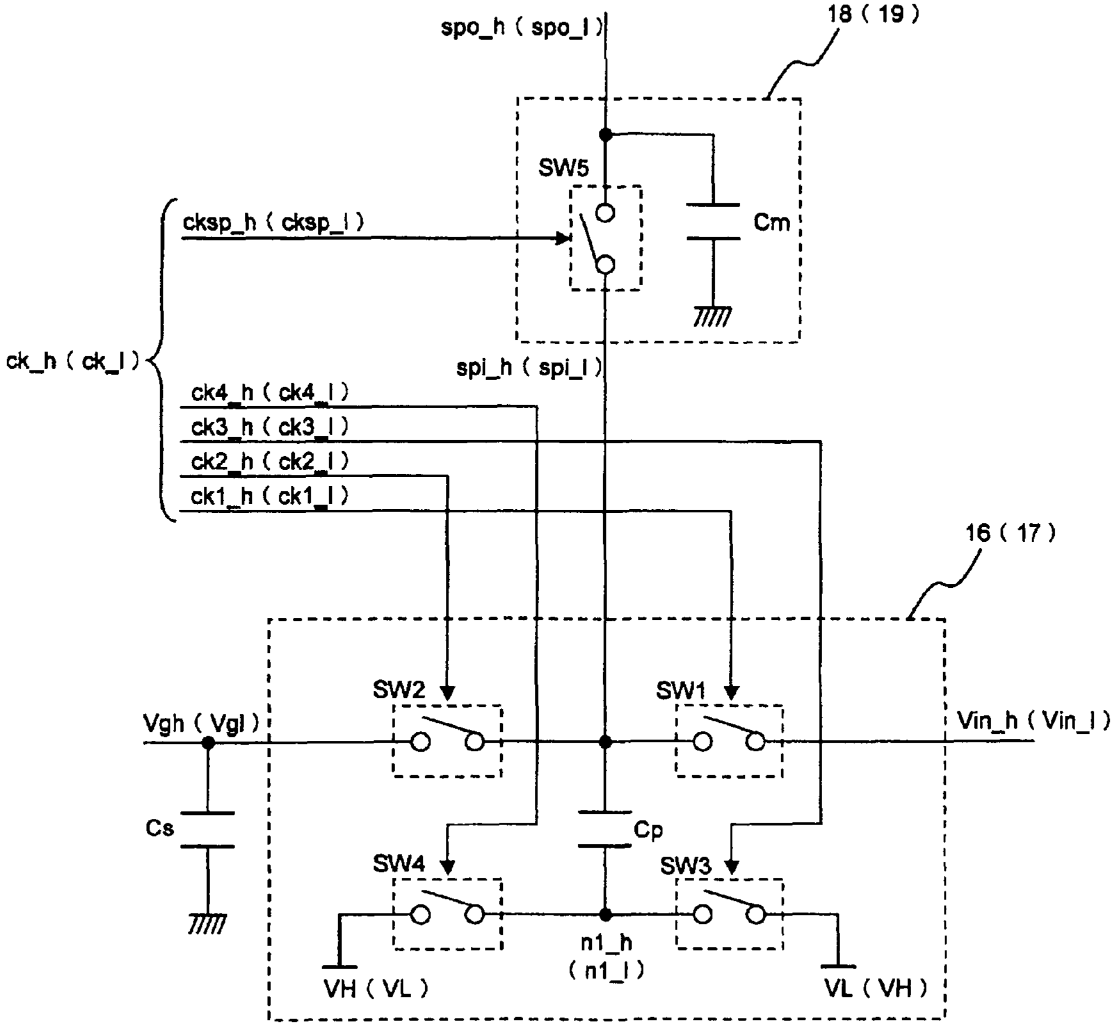
FIG. 2 is a configuration diagram of a charge pump booster and a sampler according to a first embodiment of the present invention.

FIG. 2 is a schematic diagram showing a circuit configuration of the charge pump boosters 16 and 17 and the samplers 18 and 19. Characters in ( ) in FIG. 2 denote signals of the charge pump booster 17 and the sampler 19 for Vgl. Characters outside ( ) in FIG. 2 denote signals of the charge pump booster 16 and the sampler 18 for Vgh. Hereafter, characters having a signal name with _h added denote a signal relating to generation of Vgh, whereas characters having a signal name with _l added denote a signal relating to generation of Vgl.

Hereafter, a configuration of a charge pump booster in the present embodiment will be described. The charge pump booster shown in FIG. 2 includes pumping capacitance Cp and four switches SW1 to SW4 for controlling connections at both ends of the pumping capacitance Cp. Boosting clocks ck1 to ck4 are input respectively to the switches SW1 to SW4 to control their respective on-states and off-states.

A boosting power supply voltage Vin is connected to a first terminal of the first switch SW1. A second terminal of the first switch SW1 is connected to a first terminal of the pumping capacitance Cp and a first terminal of the second switch SW2. A second terminal of the second switch SW2 is connected to a first terminal of stabilizing capacitance Cs for stabilizing an output voltage of the charge pump booster. Here, a second terminal of the stabilizing capacitance Cs is, for example, grounded (connected to GND).

Connections of the third switch SW3 and the fourth switch SW4 differ depending upon whether the charge pump booster and the sampler are intended for Vgh (voltage doubling boosting) or Vgl (inversion boosting).

In other words, in the case of Vgh (voltage doubling boosting), a first terminal of the third switch SW3 is connected to a low voltage source VL. A second terminal of the third switch SW3 is connected to a second terminal of the pumping capacitance Cp and a first terminal of the fourth switch SW4. A second terminal of the fourth switch SW4 is connected to a high voltage source VH.

On the other hand, in the case of Vgl (inversion boosting), the first terminal of the third switch SW3 is connected to the high voltage source VH. The second terminal of the third switch SW3 is connected to the second terminal of the pumping capacitance Cp and the first terminal of the fourth switch SW4. The second terminal of the fourth switch SW4 is connected to the low voltage source VL.

The high voltage source VH and the low voltage source VL are voltage sources supplied from the internal power supply generator 2 on the basis of the setting signal reg_h or reg_l set in the setting register 1.

In the charge pump booster 16 (17) in the present embodiment, the first terminal of the pumping capacitance Cp generates the internal voltage spi for monitoring an output and supplies the internal voltage spi to the sampler 18 (19). The sampler 18 (19) includes a switch SW5 controlled by a control signal cksp included in a boosting clock ck, and capacitance Cm for retaining a sampled internal voltage. The sampler 18 (19) retains the voltage across the capacitance Cm according to timing of the control signal cksp, and outputs the output monitoring signal spo to the output monitor 6 (9).

Operation of the charge pump booster and sampler shown in FIG. 2 will now be described with reference to FIGS. 3 and 4.

Figure 3:
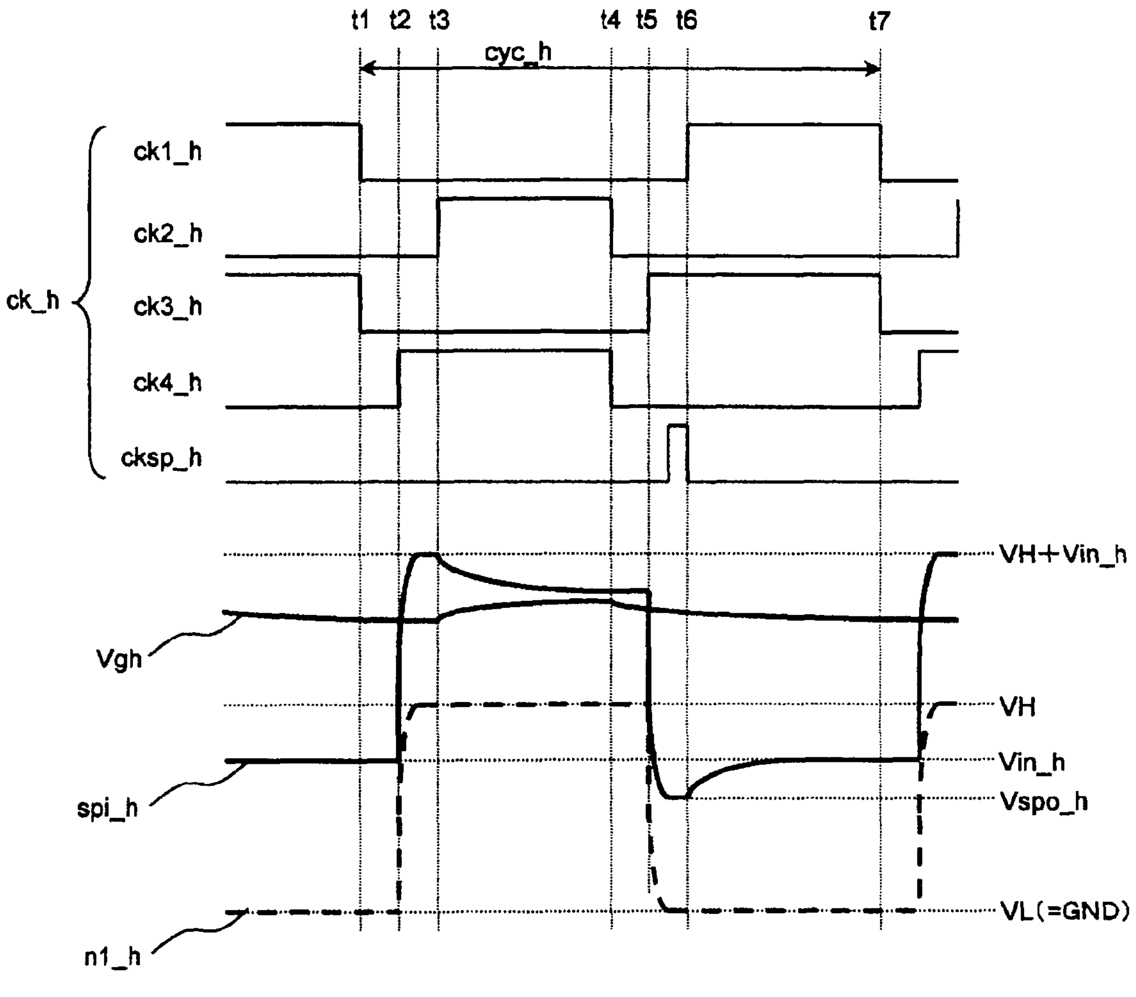
FIG. 3 is a timing chart and a voltage waveform diagram showing operation of a Vgh booster in a first embodiment of the present invention.

FIG. 3 is a timing chart of the boosting clock ck_h and a voltage waveform diagram of the booster 16 showing operation in the case where the charge pump booster is intended for Vgh (voltage doubling boosting).

Hereafter, it is supposed that voltage levels of the boosting clock ck are two levels: a high level and a low level, in order to simplify the description. It is also supposed that when a boosting clock is at the high level a corresponding switch SW turns on to electrically connect a first terminal to a second terminal whereas when the boosting clock is at the low level the corresponding switch SW turns off to electrically disconnect the first terminal from the second terminal.

First, in time periods before time t1, boosting clocks ck1_h and ck3_h are at the high level, whereas boosting clocks ck2_h and ck4_h are at the low level. As a result, the voltage Vin_h input from the SW1 is charged on the pumping capacitance Cp. In the ensuing description, it is supposed that the potential of the low voltage source VL is GND. However, the potential of the low voltage source VL is not restricted to GND.

Thereafter, ck1_h and ck3_h become the low level at time t1. As a result, both terminals of the pumping capacitance Cp are brought into the electrically floating state to retain Vin_h applied earlier.

Thereafter, ck4_h becomes the high level at time t2. As a result, the SW4 turns on and n1_h which is a second terminal of Cp is connected to the high voltage source VH. At that time, the potential at the first terminal of Cp rises up to nearly VH+Vin_h because SW1 and SW2 and SW5 in the sampler are disconnected.

And ck2_h becomes the high level at time t3. As a result, SW2 turns on. Accordingly, the first terminal of Cp is connected to the stabilizing capacitance Cs and the scanning line driver 12 which is the load.

For a time period between the time t3 and time t4 when ck2_h and ck4_h become the low level, power is supplied from Cp to Cs and the scanning line driver 12. At this time, the potential of the output voltage Vgh becomes lower than the voltage at the first terminal of Cp according to output resistance of the switch SW2.

Furthermore, the output voltage Vgh and the voltage at the first terminal of Cp change according to the state of the current consumption in the scanning line driver 12. When the current consumption is low (the load is light), the voltage drop at the first terminal of Cp becomes small for the time period between the time t3 and the time t4. When the current consumption is high (the load is heavy), the voltage drop at the first terminal of Cp becomes large for the time period between the time t3 and the time t4.

At the time t4, therefore, ck2_h and ck4_h become the low level, and the time period for supplying power to the load (the scanning line driver 12) and the stabilizing capacitance Cs is finished. As a result, charge is supplied from the stabilizing capacitance Cs to the load. A voltage that reflects the state of the current consumption for the time period between the time t3 and the time t4 is retained at the first terminal of Cp.

At time t5, ck3_h is changed to the high level to connect the second terminal of Cp to VL. In this state, cksp_h is changed to the high level. As a result, the voltage at the first terminal of Cp can be sampled onto the capacitance Cm in the sampler 18.

As a result, the internal voltage of the charge pump booster 16 which changes according to the load state can be sampled onto the capacitance Cm. In addition, its potential can be made lower than the boosting power supply voltage Vin_h.

Therefore, the output monitoring signal spo_h sampled onto the capacitance Cm is brought into the withstand voltage range of the drive circuit 101. Accordingly, it becomes possible for the drive circuit 101 to monitor the output state of the booster 16 incorporated in the liquid crystal panel 102.

Subsequently, cksp_h goes to the low level and the ck1_h goes to the high level at time t6. As a result, Vin_h is charged at the first terminal of Cp.

After time t7, the operation conducted after the time t1 described earlier is repeated. The output voltage Vgh is obtained by repeating the operation conducted between the time t1 and the time t7.

When each switch is formed of a three-terminal switching element such as a TFT (thin film transistor) in the charge pump booster 16 and the sampler 18 shown in FIG. 2 and described heretofore, a scheme in which SW3 is formed of an n-type TFT and SW1, SW2 and SW4 are formed of p-type TFTs is conceivable as an example. In this case, ck3_h corresponds to positive logic operation in which the high level brings about the on-state, whereas ck1_h, ck2_h and ck4_h correspond to negative logic operation in which the low level brings about the on-state.

If the on-off control voltage of the switching elements is insufficient, then it is desirable to install level shifters between the boosting clock ck_h output by the drive circuit 101 and the booster and the sampler to conduct voltage level conversion. For example, as for the ck2_h signal, it is desirable to convert the high level to at least Vgh and the low level to VL. Either of the n-type TFT and the p-type TFT may be used as SW5 in the sampler. However, it is a matter of course that cksp_h needs to be converted so as to correspond to it at that time.

Figure 4:
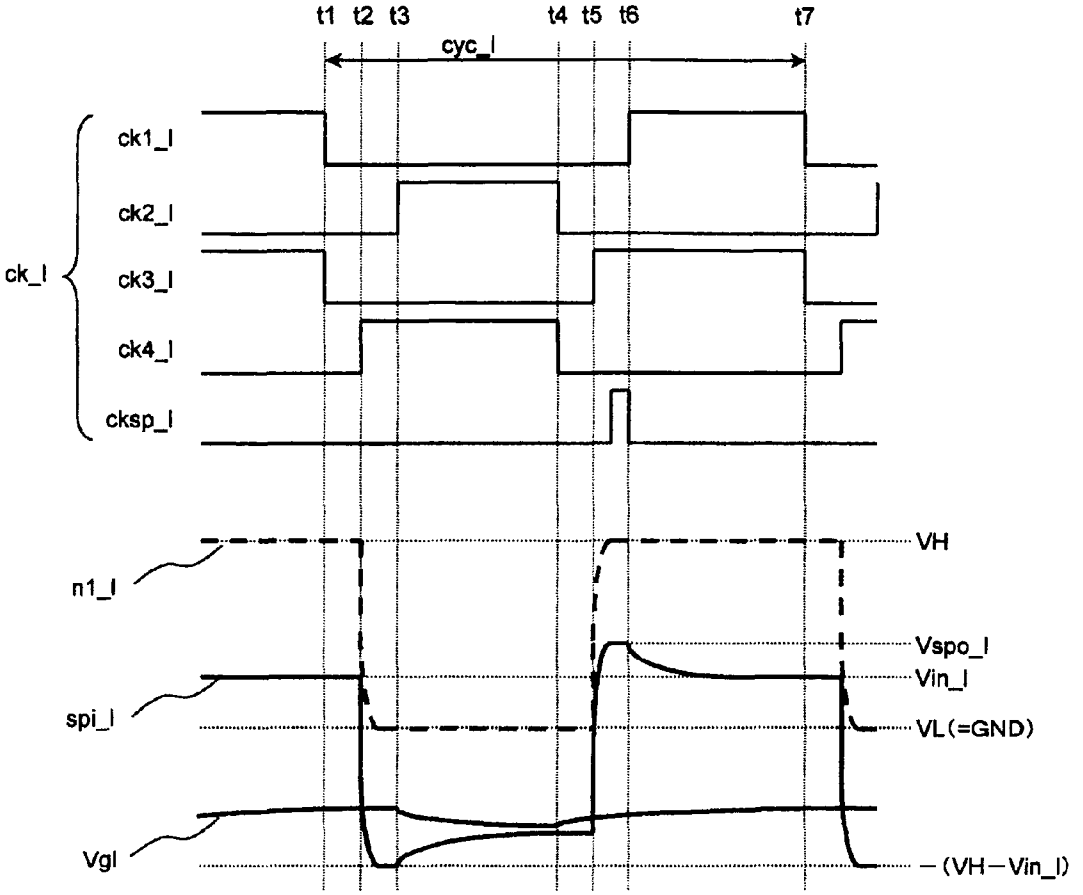
FIG. 4 is a timing chart and a voltage waveform diagram showing operation of a Vgl booster in a first embodiment of the present invention.

FIG. 4 is a timing chart of the boosting clock ck_l and a voltage waveform diagram of the booster 17 showing operation in the case where the charge pump booster is intended for Vgl (inversion boosting).

Hereafter, it is supposed that voltage levels of the boosting clock ck are two levels: a high level and a low level, in order to simplify the description in the same way as the foregoing description. It is also supposed that when a boosting clock is at the high level a corresponding switch SW turns on to electrically connect a first terminal to a second terminal whereas when the boosting clock is at the low level the corresponding switch SW turns off to electrically disconnect the first terminal from the second terminal.

First, in time periods before time t1, boosting clocks ck1_l and ck3_l are at the high level, whereas boosting clocks ck2_l and ck4_l are at the low level. As a result, the voltage Vin_l input from the SW1 is applied to the pumping capacitance Cp. The high voltage source VH is also applied to the pumping capacitance Cp via SW3. If VH is higher in potential than Vin_l, then a voltage VH−Vin_l is applied across Cp.

Thereafter, ck1_l and ck3_l become the low level at time t1. As a result, both terminals of the pumping capacitance Cp are brought into the electrically floating state to retain VH−Vin_l applied earlier.

Thereafter, ck4_l becomes the high level at time t2. As a result, the SW4 turns on and n1_l which is a second terminal of Cp is connected to the low voltage source VL. In the ensuing description, it is supposed that the low voltage source VL has a potential of GND. However, the potential of VL is not restricted to GND. At that time, the potential at the first terminal of Cp falls to nearly −(VH−Vin_l) because SW1 and SW2 and SW5 in the sampler 19 are in the off state.

And ck2_l becomes the high level at time t3. As a result, SW2 turns on. Accordingly, the first terminal of the pumping capacitance Cp is connected to the stabilizing capacitance Cs and the scanning line driver 12 which is the load. For a time period between the time t3 and time t4 when ck2_l and ck4_l become the low level, power is supplied from Cp to Cs and the scanning line driver 12. At this time, the potential of the output voltage Vgl becomes higher than the voltage at the first terminal of Cp according to output resistance of the switch SW2.

Furthermore, the output voltage Vgl and the voltage at the first terminal of Cp change according to the state of the current consumption in the scanning line driver 12. When the current consumption is low (the load is light), the voltage rise at the first terminal of Cp becomes small for the time period between the time t3 and the time t4. When the current consumption is high (the load is heavy), the voltage drop at the first terminal of Cp becomes large for the time period between the time t3 and the time t4.

At the time t4, therefore, ck2_l and ck4_l become the low level, and the time period for supplying power to the load (the scanning line driver 12) and the stabilizing capacitance Cs is finished. As a result, charge is supplied from the stabilizing capacitance Cs to the load. A voltage that reflects the state of the current consumption for the time period between the time t3 and the time t4 is retained at the first terminal of Cp.

At time t5, ck3_l is changed to the high level to connect the second terminal of Cp to VH. In this state, cksp_l is changed to the high level. As a result, the voltage at the first terminal of Cp can be sampled onto the capacitance Cm in the sampler 19.

As a result, the internal voltage of the charge pump booster 17 which changes according to the load state can be sampled onto the capacitance Cm. In addition, its potential can be made lower than the high voltage source VH.

Therefore, the output monitoring signal spo_l sampled onto the capacitance Cm is brought into the withstand voltage range of the drive circuit 101. Accordingly, it becomes possible for the drive circuit 101 to monitor the output state of the booster 17 incorporated in the liquid crystal panel 102.

Subsequently, cksp_l goes to the low level and the ck1_l goes to the high level at time t6. As a result, Vin_l is charged at the first terminal of Cp.

After time t7, the operation conducted after the time t1 described earlier is repeated. The output voltage Vgl is obtained by repeating the operation conducted between the time t1 and the time t7.

When each switch is formed of a three-terminal switching element such as a TFT (thin film transistor) in the charge pump booster 17 and the sampler 19 shown in FIG. 2 and described heretofore, a scheme in which SW3 is formed of an n-type TFT and SW1, SW2 and SW4 are formed of p-type TFTs is conceivable as an example. In this case, ck4_l corresponds to positive logic operation in which the high level brings about the on-state, whereas ck1_l to ck4_l correspond to negative logic operation in which the low level brings about the on-state.

If the on-off control voltage of the switching elements is insufficient, then it is desirable to install level shifters between the boosting clock ck_l output by the drive circuit 101 and the booster and the sampler to conduct voltage level conversion. For example, as for the ck2_l signal, it is desirable to convert the high level to VH and the low level to −(VH−Vin_l).

Either of the n-type TFT and the p-type TFT may be used as SW5 in the sampler. However, it is a matter of course that cksp_l needs to be converted so as to correspond to it at that time.

The pumping capacitance Cp and the stabilizing capacitance Cs in the booster shown in FIG. 2 are shown to be included in the liquid crystal panel 102. However, the arrangement configuration is not restricted to this.

The TFT forming each switch may include amorphous silicon or may include polycrystalline Si having a high mobility.

In addition, the capacitance Cm in the sampler is also included in the sampler. However, the arrangement configuration is not restricted to this.

As described heretofore, it is possible to obtain the output monitoring signal spo which changes according to the load (output current) state of the booster by using the sampler at the same time according to the timing charts shown in FIGS. 3 and 4.

Hereafter, a control method of the charge pump booster using the output monitoring signal spo will be described with reference to FIGS. 5-7A-7C.

Figure 5:
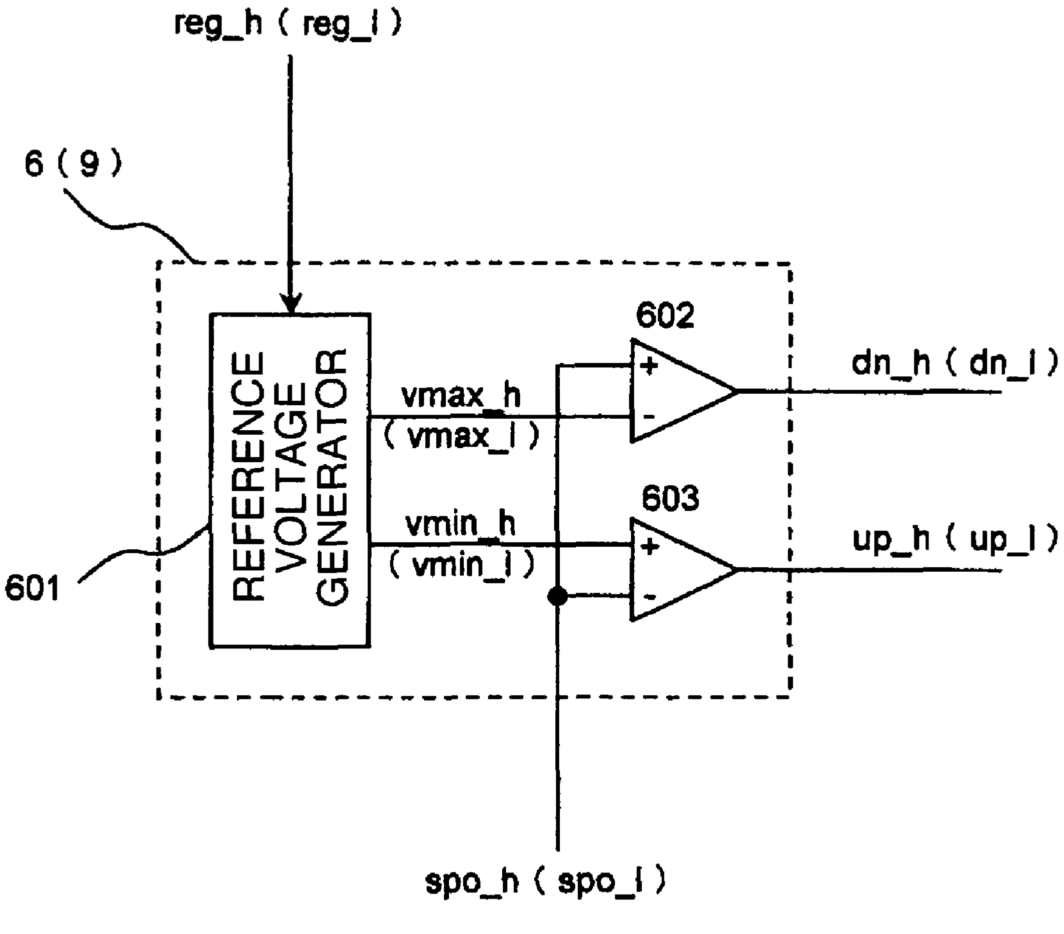
FIG. 5 is a configuration diagram of an output monitor in a first embodiment of the present invention.

FIG. 5 is a schematic diagram showing a configuration of the output monitor 6 (9). In FIG. 5, characters in ( ) indicate various signals in the output monitor 9 for inversion boosting (for Vgl), whereas characters outside ( ) indicate various signals in the output monitor 6 for voltage double boosting (for Vgh). The output monitor 6 (9) includes a reference voltage generator 601, a voltage comparator 602 and a voltage comparator 603.

The setting signal reg_h (reg_l) output from the setting register 1 includes a setting value which determines an allowable voltage range of the output voltage Vgh (Vgl). The reference voltage generator 601 generates a maximum value vmax_h (vmax_l) and a minimum value vmin_h (vmin_l) of the output voltage set by reg_h (reg_l), and outputs them to the voltage comparators 602 and 603. It is supposed that potential output by the reference voltage generator 601 satisfies the relations vmax_h>vmin_h and vmax_l>vmin_l.

The allowable maximum voltage vmax_h (vmax_l) and the output monitoring signal spo_h (spo_l) are input to the voltage comparator 602. If spo_h (spo_l) is higher in potential than vmax_h (vmax_l), then the voltage comparator 602 outputs the monitoring result signal dn_h (dn_l) as an active signal. Supposing that the active signal has the high level, the description will be continued. However, it matters little even if the active signal has the low level.

If spo_h (spo_l) is higher in potential than vmax_h (vmax_l), then dn_h (dn_l) becomes high in level. If spo_h (spo_l) is equal to or less than vmax_h (vmax_l) in potential, then dn_h (dn_l) becomes low in level.

On the other hand, the allowable minimum voltage vmin_h (vmin_l) and the output monitoring signal spo_h (spo_l) are input to the voltage comparator 603. If spo_h (spo_l) is lower in potential than vmin_h (vmin_l), then the voltage comparator 603 outputs the monitoring result signal up_h (up_l) as an active signal. Supposing that the active signal has the high level, the description will be continued. However, it matters little even if the active signal has the low level.

If spo_h (spo_l) is lower in potential than vmin_h (vmin_l), then up_h (up_l) becomes high in level. If spo_h (spo_l) is at least vmin_h (vmin_l) in potential, then up_h (up_l) becomes low in level.

A control method of the charge pump booster using the monitoring result signals dn and up will now be described with reference to FIGS. 6A-6C and 7A-7C.

Two methods: a method of controlling the voltage level of the boosting power supply voltage Vin shown in FIGS. 6A-6C and a method of controlling the period of the boosting clock shown in FIGS. 7A-7C will now be described as the method for controlling the output of the charge pump booster.

First, the method of controlling the output of the charge pump booster 16 for Vgh (for voltage doubling boosting) by adjusting the level of the boosting power supply voltage Vin_h will now be described with reference to FIGS. 6A-6C. At this time, the boosting clock ck_h for Vgh is generated by the boosting clock generator 7 on the basis of the setting value of the Vgh setting signal reg_h, and it is not changed by the output monitoring signal spo_h.

Figure 6A:
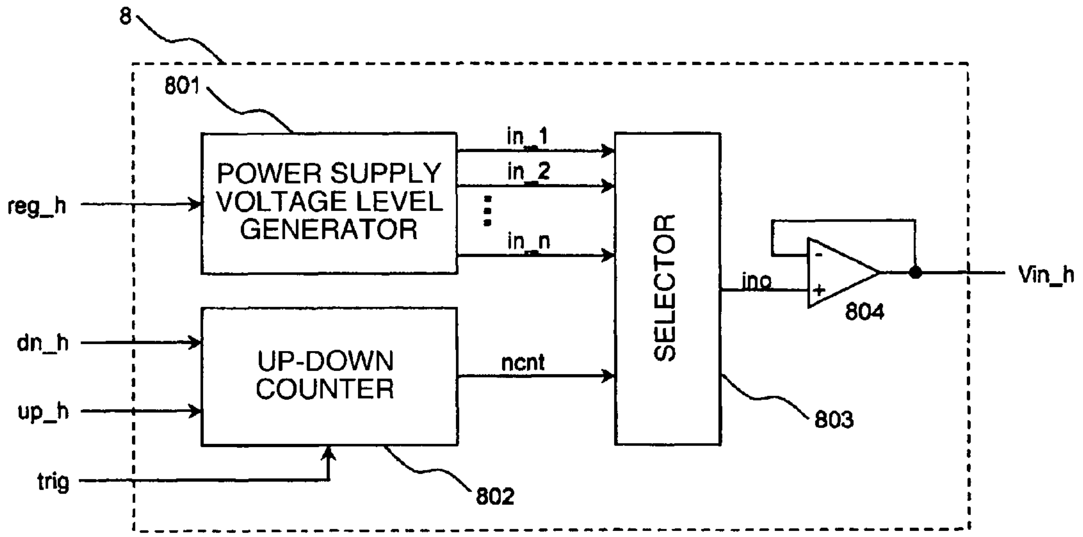
FIGS. 6A-6C are a configuration diagram and a timing chart of a booster power supply generator in a first embodiment of the present invention.

As shown in FIG. 6A, the boosting power supply generator 8 for adjusting the level of the boosting power supply voltage Vin_h includes a power supply voltage level generator 801, an up-down counter 802, a selector 803, and a power supply voltage outputting operational amplifier 804.

The power supply voltage level generator 801 generates n voltage levels in_l to in_n according to the Vgh setting signal reg_h. The n voltage levels correspond to a count value ncnt in the range of 1 to n output from the up-down counter 802.

Figure 6B:
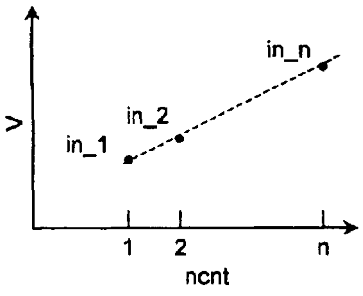

As shown in FIG. 6B, the count value ncnt is associated with the voltage level "in" in one-to-one correspondence, and the relation in_l<in_2< . . . <in_n is satisfied. However, the relation between the count value ncnt and the voltage level "in" is not restricted to this.

The up-down counter 802 which counts from 1 to n operates in synchronism with the control signal trig output from the drive controller 3. If the monitoring result signal dn_h is an active signal (which is supposed to be the high level here) when the control signal trig has become active as shown in FIG. 6C, then the up-down counter 802 subtracts 1 from the counter value. If the monitoring result signal up_h is an active signal (which is supposed to be the high level here) when the control signal trig has become active, then the up-down counter 802 increases the counter value by 1. If neither dn_h nor up_h is the active signal, the last counter value is retained. The count value ncnt of the up-down counter 802 assumes a value in the range of 1 to n.

The selector 803 outputs a voltage level associated with the count value ncnt of the up-down counter 802 from among the voltage levels shown in FIG. 6B as ino (in the range of in_l to in_n). The voltage level is output to the booster 16 as the boosting power supply voltage Vin_h via a voltage follower circuit including the operational amplifier 804.

If the output of the load (the scanning line driver 12) is large, then the output monitor 6 makes up_h the active signal. As a result, the boosting power supply voltage Vin_h can be made high in potential. Accordingly, the output of the booster 16 can be made high.

On the other hand, if the output of the load is small, then the output monitor 6 makes dn_h the active signal. As a result, the boosting power supply voltage Vin_h can be made low in potential. Accordingly, the output of the booster 16 can be made low.

The method of controlling the output of the charge pump booster 17 for Vgl (for inversion boosting) by adjusting the boosting clock ck_l will now be described with reference to FIGS. 7A-7C. At this time, the Vgl boosting power supply voltage Vin_l is generated by the boosting power supply generator 11 on the basis of the setting value of the Vgl setting signal reg_l, and it is not changed by the output monitoring signal spo_l.

Figure 7A:
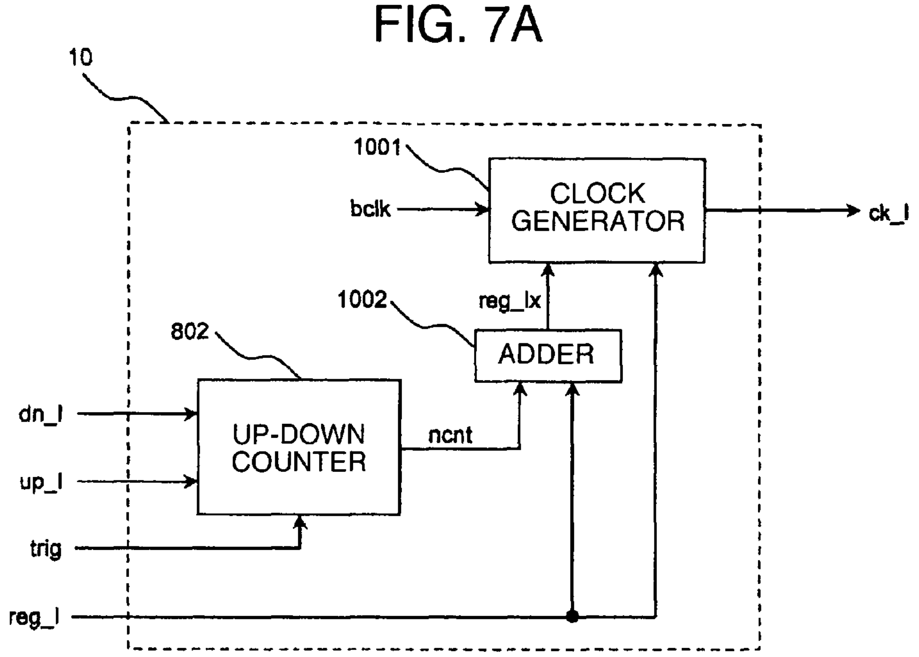
FIGS. 7A-7C are a configuration diagram and timing charts of a booster clock generator in a first embodiment of the present invention.

As shown in FIG. 7A, the boosting clock generator 10 for adjusting the boosting clock ck_l includes an up-down counter 802, an adder 1002, and a clock generator 1001. Since operation of the up-down counter 802 is the same as that of the up-down counter 802 shown in FIG. 6A, its description will be omitted.

The Vgl setting signal reg_l output by the setting register 1 includes setting information required to generate the Vgl boosting clock ck_l, such as setting values for determining position relations between various signals which can be represented by the high level time period, low level time period, period, front porch and back porch.

The clock generator 1001 generates the boosting clock ck_l on the basis of setting values of the clock determined by the Vgl setting signal reg_l and a basic clock bclk transferred from the drive controller 3.

The adder 1002 adds a number ncnt×α (where α can be arbitrarily set) depending upon a counter value ncnt in the up-down counter 802 to a part of the clock setting values transferred by the Vgl setting signal reg_l, and outputs a result to the clock generator 1001. For example, in the Vgl boosting clock, it becomes possible to adjust a time period tx between t6 and t7 shown in FIG. 7C.

In other words, it becomes possible to adjust the time period tx by adding, in the adder 1002, a number ncnt×α depending upon the counter value ncnt in the up-down counter 802 to each of a setting value which determines the high level time period of ck1_l and ck3_l and a setting value which determines the low level time period of ck2_l, ck4_l and cksp_l.

If the output of the scanning line driver 12 has increased, therefore, the Vgl output monitor 9 outputs an active signal to dn_l. As a result, a period cyc_l of the Vgl boosting clock ck_l becomes short. Accordingly, the output of the booster 17 can be raised.

On the other hand, if the output of the load is small, the Vgl output monitor 9 makes up_l an active signal. As a result, the period cyc_l of the Vgl boosting clock ck_l becomes long. Accordingly, the output of the booster 17 can be lowered.

The method of controlling the period cyc_l of the boosting clock ck_l by only increasing or decreasing the time period tx has been described. However, the method of controlling the period cyc_l is not restricted to this method, as long as the period cyc_l of the boosting clock can be adjusted. At that time, however, it is desirable to maintain the sequence of the rising edge and the falling edge of each boosting clock. Furthermore, for preventing the voltage level of the output monitoring signal spo from changing according to the condition, it is desirable to prevent a time period between time t5 and t6 from changing.

Figure 6C:
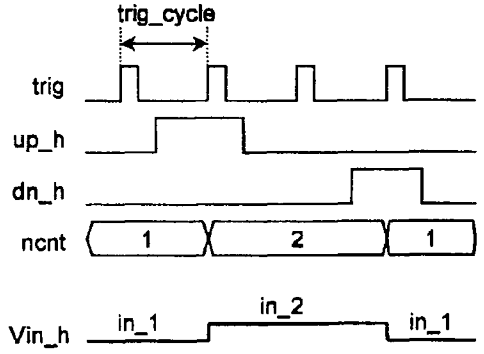
Figure 7B:
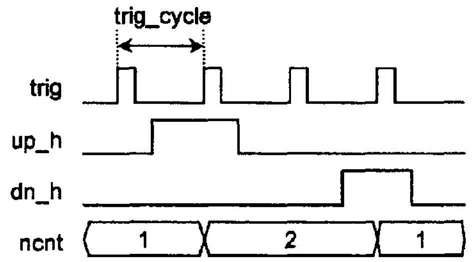
Figure 7C:
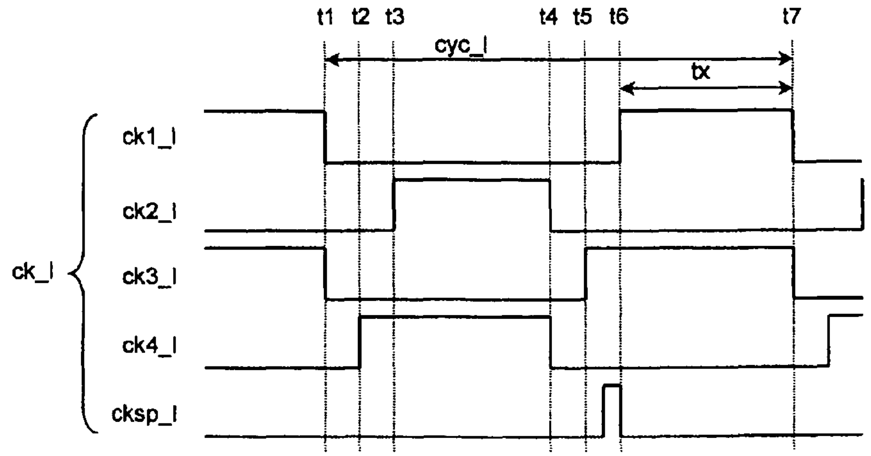

In the foregoing description, the method of adjusting the boosting power supply voltage Vin shown in FIGS. 6A-6C is applied to the control of the charge pump booster 16 for voltage doubling boosting, whereas the method of adjusting the boosting clock ck shown in FIGS. 7A-7C is applied to the control of the charge pump booster 17 for inversion boosting. Alternatively, the method of adjusting the boosting clock ck may be applied to the charge pump booster for voltage doubling boosting. In this case, it is desirable to cause a to be a negative number.

The method of adjusting the boosting power supply voltage Vin may be applied to the charge pump booster for inversion boosting.

A method of adjusting the charge pump booster for voltage doubling boosting and the charge pump booster for inversion boosting by using either the boosting clock ck or the boosting power supply voltage Vin may also be used.

In the present embodiment, the case of a liquid crystal display device has been described. However, the display element is not restricted to liquid crystal, but it may organic EL.

In the present embodiment, the output monitors 6 and 9, the boosting clock generators 7 and 10, and the boosting power supply generators 8 and 11 are provided in the drive circuit 101. however, this is not restrictive, but they may be provided in the liquid crystal panel 102.

Second Embodiment

A second embodiment of the present invention will now be described. The present embodiment differs from the first embodiment in the configuration of the charge pump boosters 16 and 17 incorporated in the liquid crystal panel 102 in the liquid crystal display device shown in FIG. 1. Therefore, signal names and circuit names common to those in the first embodiment are used as they are, and description of them will be omitted.

Figure 8A:
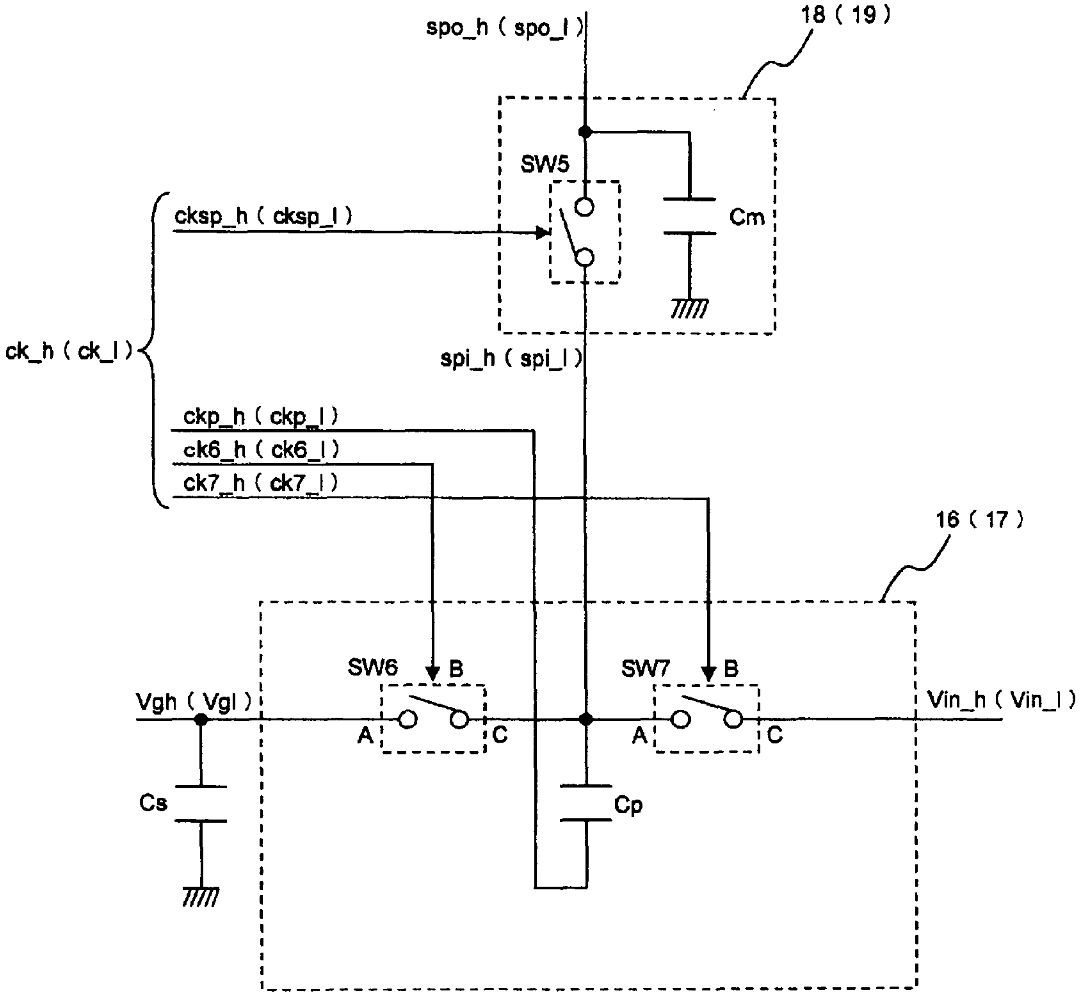
FIGS. 8A-8C are configuration diagrams of a charge pump booster and a sampler in a first embodiment of the present invention.

FIG. 8A is a schematic diagram showing a configuration of a charge pump booster in the present embodiment. Hereafter, the configuration of the charge pump booster in the present embodiment will be described.

The charge pump booster 16 (17) shown in FIG. 8A includes pumping capacitance Cp and switches SW6 and SW7 connected to a first terminal of the pumping capacitance Cp. Boosting clocks ck6 and ck7 are input respectively to the switches SW6 and SW7 to control their on-state and off-state.

A first terminal of the switch SW7 is connected to the boosting power supply voltage Vin. A second terminal of the switch SW7 is connected to a first terminal of the pumping capacitance Cp and a second terminal of the switch SW6. A first terminal of the switch SW6 is connected to a first terminal of stabilizing capacitance Cs for stabilizing the output voltage of the charge pump booster. A second terminal of the stabilizing capacitance Cs is, for example, grounded (connected to GND). A second terminal of the pumping capacitance Cp is connected to a boosting clock ckp.

The booster in the present embodiment has a feature that the switches can be formed of TFTs of single conductivity type.

Figure 8B:
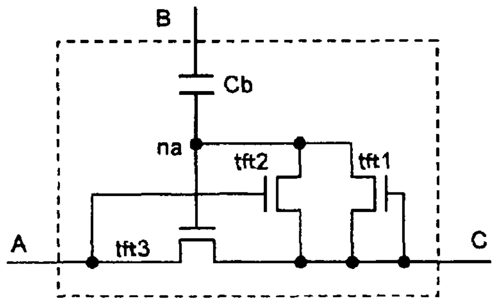
Figure 8C:
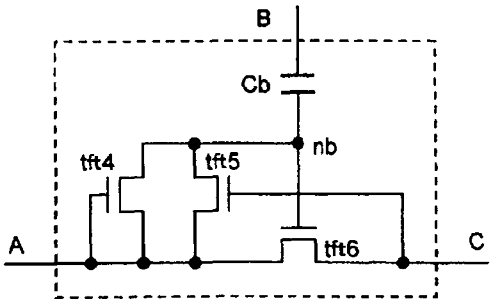

FIGS. 8B and 8C show circuit diagrams in the case where the switches in the booster are formed of TFTs of single conductivity type, here n-type TFTs. FIG. 8B shows a switch used to conduct voltage doubling boosting. FIG. 8C shows a switch used to conduct inversion boosting. Characters A, B and C shown in FIGS. 8B and 8C correspond to terminals denoted by characters A, B and C shown in FIG. 8A.

Hereafter, a configuration of a switch at the time of voltage doubling boosting shown in FIG. 8B will be described. The switch includes three n-type TFTs and capacitance Cb.

A first terminal and a gate terminal of tft1 which is a first n-type TFT are connected to the terminal C. A first terminal of tft2 which is a second n-type TFT and a first terminal of tft3 which is a third n-type TFT are connected to the terminal C. A second terminal of tft1 is connected to a second terminal of tft2, a gate terminal of tft3, and a first terminal of the capacitance Cb to form a node na. A second terminal of the capacitance Cb is connected to the terminal B. In addition, a second terminal of tft3 and a gate terminal of tft2 are connected to the terminal A.

On the other hand, hereafter, a configuration of a switch at the time of inversion boosting shown in FIG. 8C will be described. This switch also includes three n-type TFTs and capacitance Cb in the same way as the foregoing description.

A first terminal and a gate terminal of tft4 which is a fourth n-type TFT are connected to the terminal A. A first terminal of tft5 which is a fifth n-type TFT and a first terminal of tft6 which is a sixth n-type TFT are connected to the terminal A. A second terminal of tft4 is connected to a second terminal of tft5, a gate terminal of tft6, and a first terminal of the capacitance Cb to form a node nb. A second terminal of the capacitance Cb is connected to the terminal B. In addition, a second terminal of tft6 and a gate terminal of tft5 are connected to the terminal C.

Operation of the booster shown in FIG. 8A will now be described with reference to FIGS. 9 and 10.

Figure 9:
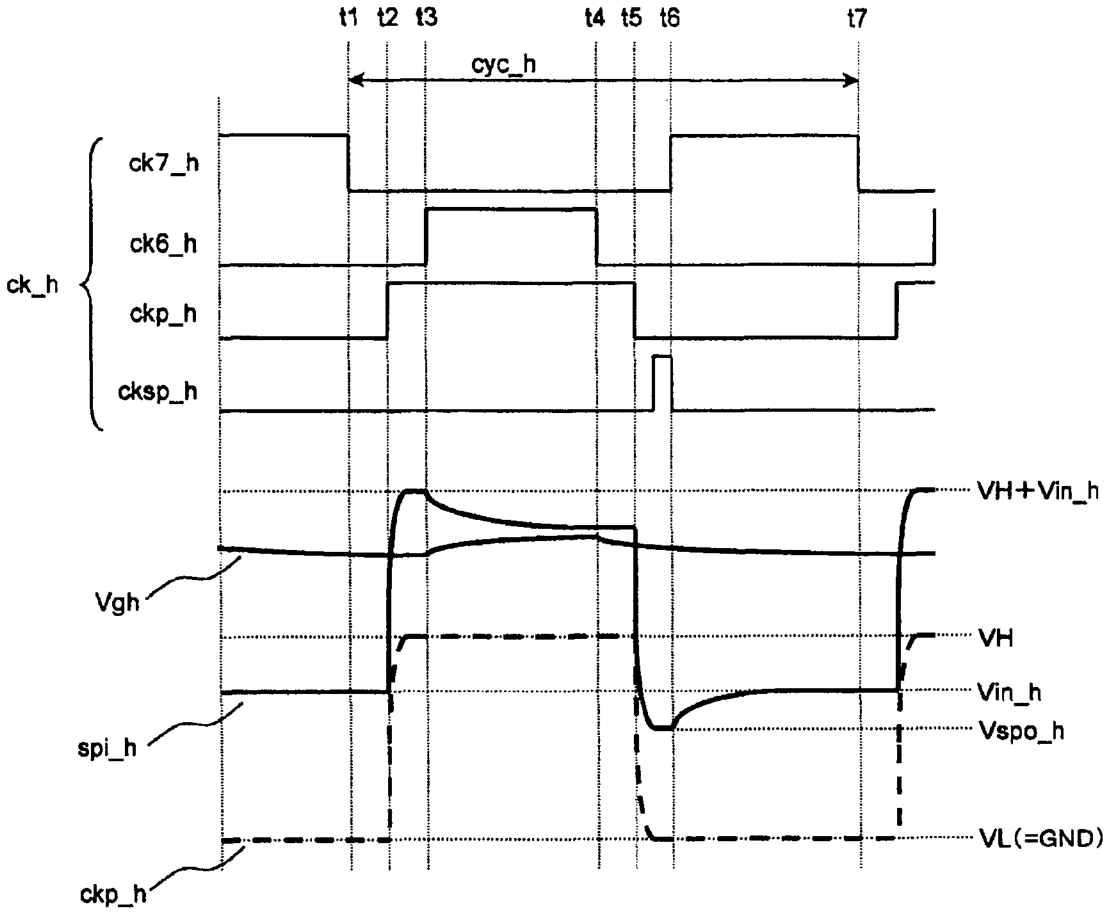
FIG. 9 is a timing chart and a voltage waveform diagram showing operation a Vgh booster in a second embodiment of the present invention.

FIG. 9 is a timing chart of a boosting clock ck_h and a voltage waveform diagram of the booster showing operation in the case where the charge pump booster is intended for Vgh (voltage doubling boosting).

As for boosting clocks ck6_h, ck7_h and ckp_h, the high level is the high voltage source VH and the low level is the low voltage source VL.

The high voltage source VH and the low voltage source VL are voltage sources supplied from the internal power supply generator 2 on the basis of setting signals reg_h and reg_l.

As for the boosting clock of the booster in the present embodiment, a time period between time t1 and t7 is one period cyc_h. Power is supplied by repeating the period cyc_h.

For a time period between time t5 and time t6, all of the boosting clocks ck6_h, ck7_h and ckp_h for controlling the booster are in the state of VL. At that time, the internal node na in the SW7 is charged to a potential which is lower than Vin_h by a threshold voltage Vth of tft1, because tft1 is diode-connected.

Thereafter, ck7_h changes to VH at time t6, and the potential at the node na is raised by approximately VH due to influence of Cb in SW7. For a time period between t6 when ck7_h changes to VH and t7, tft3 is in the on-state and the first terminal of the pumping capacitance Cp is charged up to Vin_h. At that time, the potential at ckp_h connected to the second terminal of the pumping capacitance Cp is VL. Supposing the potential of VL to be GND, the voltage of Vin_h is charged across the pumping capacitance Cp. In the ensuing description, the potential of VL is supposed to be GND. However, the potential of VL is not restricted to this.

Subsequently, ck7_h changes to VL at time t7 (=t1), and tft3 turns off. Thereafter, ckp_h changes to VH at time t2. As a result, the voltage spi_h at the first terminal of the pumping capacitance Cp changes to approximately Vin_h+VH.

At this time, tft2 in SW7 turns on. As a result, the node na in SW7 is charged up to Vin_h. Therefore, it becomes possible to apply a higher gate voltage to tft3 in SW7 for a time period between t6 and t7. Since tft3 in SW7 is in the off state at this time, SW7 turns off.

On the other hand, in SW6, the voltage spi_h at the first terminal of the pumping capacitance Cp changes to approximately Vin_h+VH. Because of the diode-connected tft1, the internal node na is charged nearly to potential lowered from Vin_h+VH by the threshold voltage of tft1. At this time, the voltage drop in spi_h can be reduced by setting the capacitance value of Cp equal to a large value.

Thereafter, ck6_h becomes VH at time t3. As a result, the potential at the node na is raised by approximately VH due to the influence of the capacitance Cb of SW6. Since tft3 in SW6 turns on, the SW6 itself turns on. It is thus possible to supply the voltage of Vin_h+VH to the stabilizing capacitance Cs and the load (scanning line driver).

Thereafter, ck6_h is changed to VL to turn off tft3 in SW6 at time t4. At time t5, ckp_h is changed to VL to prepare for the next charging time period of Cp.

For time periods except the time period between t3 and t4, power is supplied from the stabilizing capacitance Cs to the load. It becomes possible to obtain the output voltage Vgh by repeating the operation of the period cyc_h described heretofore. For the time period between time t3 and t4, the output voltage Vgh converges toward the potential spi_h at the first terminal of the pumping capacitance Cp. The potential of the output voltage Vgh at this time becomes lower than the voltage at the first terminal of the pumping capacitance Cp, according to the output resistance of tft3 in the switch SW6. However, the potential of the output voltage Vgh at this time becomes lower than the voltage at the first terminal of the pumping capacitance Cp according to the output resistance of tft3 in the switch SW6.

The output voltage Vgh and the voltage at the first terminal of the pumping capacitance Cp change according to the state of current consumption in the scanning line driver 12. If the current consumption is small (the load is light), the voltage drop at the first terminal of the pumping capacitance Cp becomes small for this time period. If the current consumption is large (the load is heavy), the voltage drop at the first terminal of the pumping capacitance Cp becomes large for this time period.

At time t4, therefore, ck6_h becomes VL, and the time period for supplying charge to the load (the scanning line driver 12) and the stabilizing capacitance Cs is finished. As a result, charge is supplied from the stabilizing capacitance Cs to the load. A voltage that reflects the state of the current consumption for the time period between the time t3 and the time t4 is retained at the first terminal of the pumping capacitance Cp.

At time t5, ckp_h is changed to VL. In this state, cksp_h is changed to the high level. As a result, the voltage at the first terminal of the pumping capacitance Cp can be sampled onto the capacitance Cm in the sampler.

As a result, the internal voltage of the charge pump booster which changes according to the load state can be sampled onto the capacitance Cm. In addition, its potential can be made lower than the boosting power supply voltage Vin.

Therefore, the output monitoring signal spo_h sampled onto the capacitance Cm is brought into the withstand voltage range of the drive circuit 101. Accordingly, it becomes possible for the drive circuit 101 to monitor the output state of the booster incorporated in the liquid crystal panel 102.

If the output resistance of tft3 in the switches SW6 and SW7 is high, then it is desirable to install level shifters capable of making the level of VH higher in potential, between the boosting clocks ck6_h and ck7_h output from the drive circuit 101 and the switches.

Either of the n-type TFT and the p-type TFT may be used as SW5 in the sampler. However, it is a matter of course that cksp_h needs to be converted so as to correspond to it at that time.

Figure 10:
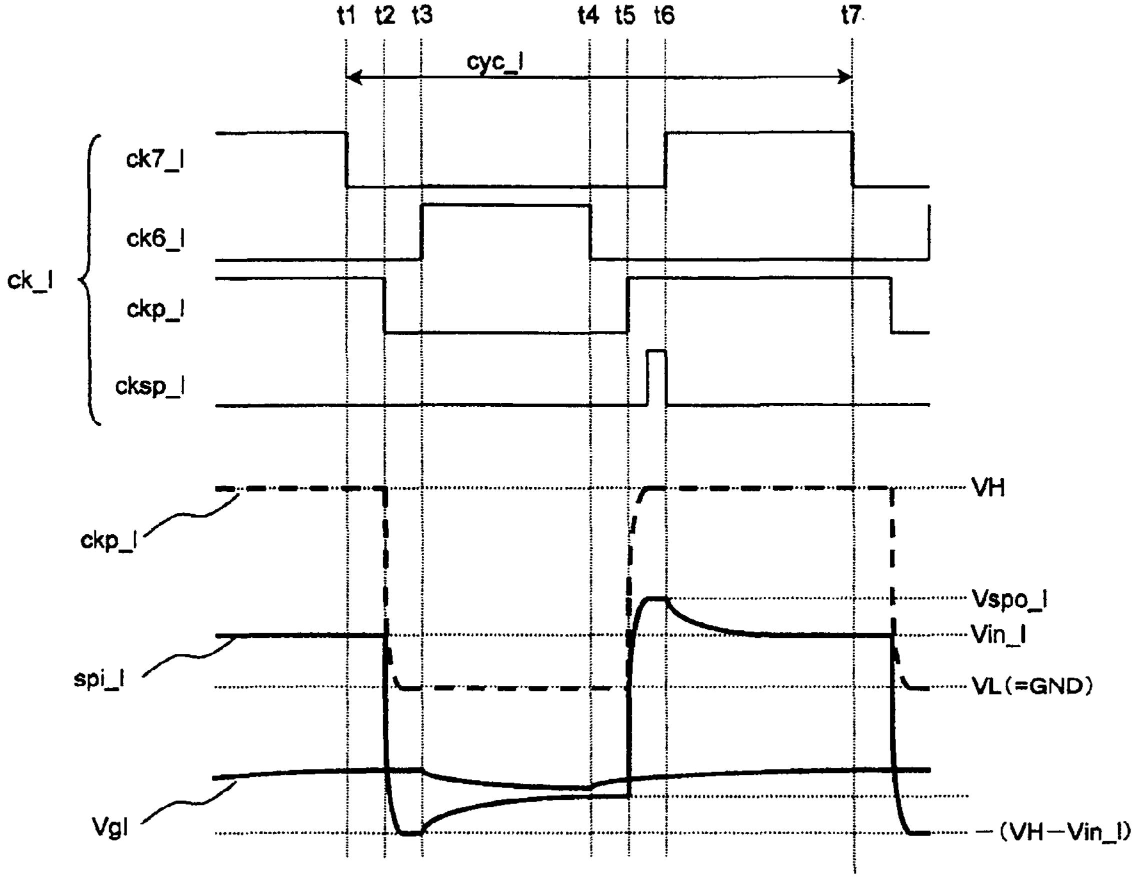
FIG. 10 is a timing chart and a voltage waveform diagram showing operation a Vgl booster in a second embodiment of the present invention.

FIG. 10 is a timing chart of the boosting clock ck_l and a voltage waveform diagram of the booster showing operation in the case where the charge pump booster is intended for Vgl (inversion boosting).

As for boosting clocks ck6_l, ck7_l and ckp_l, the high level is the high voltage source VH and the low level is the low voltage source VL. The high voltage source VH and the low voltage source VL are voltage sources supplied from the internal power supply generator 2 on the basis of setting signals reg_h and reg_l.

As for the boosting clock of the booster in the present embodiment, a time period between time t1 and t7 is one period cyc_l. Power is supplied by repeating the period cyc_l.

For a time period between time t4 and time t5, all of the boosting clocks ck6_l, ck7_l and ckp_l for controlling the booster are in the state of VL. Thereafter, ckp_l becomes VH at time t5, and consequently the voltage spi_l at the first terminal of the pumping capacitance Cp rises by approximately VH. At that time, charge is supplied to the node nb via tft4 incorporated in SW7, and nb is charged to a potential which is lower than spi_l by a threshold voltage Vth of tft4.

Thereafter, ck7_l changes to VH at time t6, and the potential at the node nb is raised by approximately VH due to influence of Cb in SW7. As a result, tft6 turns on, and the voltage spi_l at the first terminal of the pumping capacitance Cp is discharged to Vin_l.

Thereafter, ck7_l is changed to V1 at time t7 (=t1). As a result, tft6 in SW7 turns off.

Thereafter, ckp_l is changed to VL at time t2. Supposing the potential of VL to be GND, therefore, the voltage spi_l at the first terminal of the pumping capacitance Cp is changed to approximately −(VH−Vin_l). In the ensuing description, the potential of VL is supposed to be GND. However, the potential of VL is not limited to GND.

Thereafter, ck6_l is changed to VH at time t3. As a result, the potential at the node nb is raised due to the influence of the capacitance Cb of SW6. Since tft6 turns on and the SW6 turns on, the voltage of approximately −(VH−Vin_l) is supplied from the pumping capacitance Cp to the stabilizing capacitance Cs and the load.

Thereafter, ck6_l is changed to VL at time t4. As a result, SW6 turns off to prepare for the next discharge time period of Cp. For time periods except the time period between t3 and t4, therefore, power is supplied from the stabilizing capacitance Cs to the load.

It becomes possible to obtain the output voltage Vgl by repeating the operation of the period cyc_l described heretofore.

For the time period between time t3 and t4, the output voltage Vgh converges toward the potential spi_l at the first terminal of the pumping capacitance Cp. The potential of the output voltage Vgl at this time becomes higher than the voltage at the first terminal of the pumping capacitance Cp, according to the output resistance of tft6 in the switch SW6.

The output voltage Vgl and the voltage at the first terminal of the pumping capacitance Cp change according to the state of current consumption in the scanning line driver 12. If the current consumption is small (the load is light), the voltage rise at the first terminal of the pumping capacitance Cp becomes small for this time period. If the current consumption is large (the load is heavy), the voltage drop at the first terminal of the pumping capacitance Cp becomes large for this time period.

At time t4, therefore, ck6_l becomes VL, and the time period for supplying charge to the load (the scanning line driver 12) and the stabilizing capacitance Cs is finished. As a result, power is supplied from the stabilizing capacitance Cs to the load. A voltage that reflects the state of the current consumption for the time period between the time t3 and the time t4 is retained at the first terminal of the pumping capacitance Cp.

At time t5, ckp_l is changed to VH. In this state, cksp_l is changed to the high level. As a result, the voltage at the first terminal of the pumping capacitance Cp can be sampled onto the capacitance Cm in the sampler.

As a result, the internal voltage of the charge pump booster which changes according to the load state can be sampled onto the capacitance Cm. In addition, its potential can be made lower than the high voltage source VH.

Therefore, the output monitoring signal spo_l sampled onto the capacitance Cm is brought into the withstand voltage range of the drive circuit 101. Accordingly, it becomes possible for the drive circuit 101 to monitor the output state of the booster incorporated in the liquid crystal panel 102.

If the output resistance of tft6 in the switches SW6 and SW7 is high, then it is desirable to install level shifters capable of making the level of VH higher in potential, between the boosting clocks ck6_l and ck7_l and the switches.

Either of the n-type TFT and the p-type TFT may be used as SW5 in the sampler. However, it is a matter of course that cksp_l needs to be converted so as to correspond to it at that time.

Even if the charge pump booster shown in FIGS. 8A-8C is used, it is possible to take out the internal voltage in the booster which changes according to the output state of the load, as a signal as described heretofore. Therefore, it becomes possible to exercise output control of the booster in the same way as the first embodiment described with reference to FIGS. 5-7A-7C.

In this case, the method of adjusting the boosting power supply voltage Vin may be used, or the method of adjusting the boosting clock ck may be used as the control method. Or the method of adjusting both the boosting clock ck and the boosting power supply voltage Vin may be used.

In the description of the first embodiment and the second embodiment, the method of adjusting the boosting power supply voltage Vin is used as the method of adjusting the power supply voltage. Alternatively, a method of adjusting the potential of the high voltage source VH or the low voltage source VL may also be used.

Third Embodiment

Hereafter, a third embodiment of the present invention will be described with reference to FIG. 11. The present embodiment differs in the configuration of the charge pump boosters 16 and 17 and the samplers 18 and 19 incorporated in the liquid crystal panel 102 of the liquid crystal display device shown in FIG. 1. Signal names and circuit names common to those in the first embodiment are used as they are, and description of them will be omitted.

Figure 11:
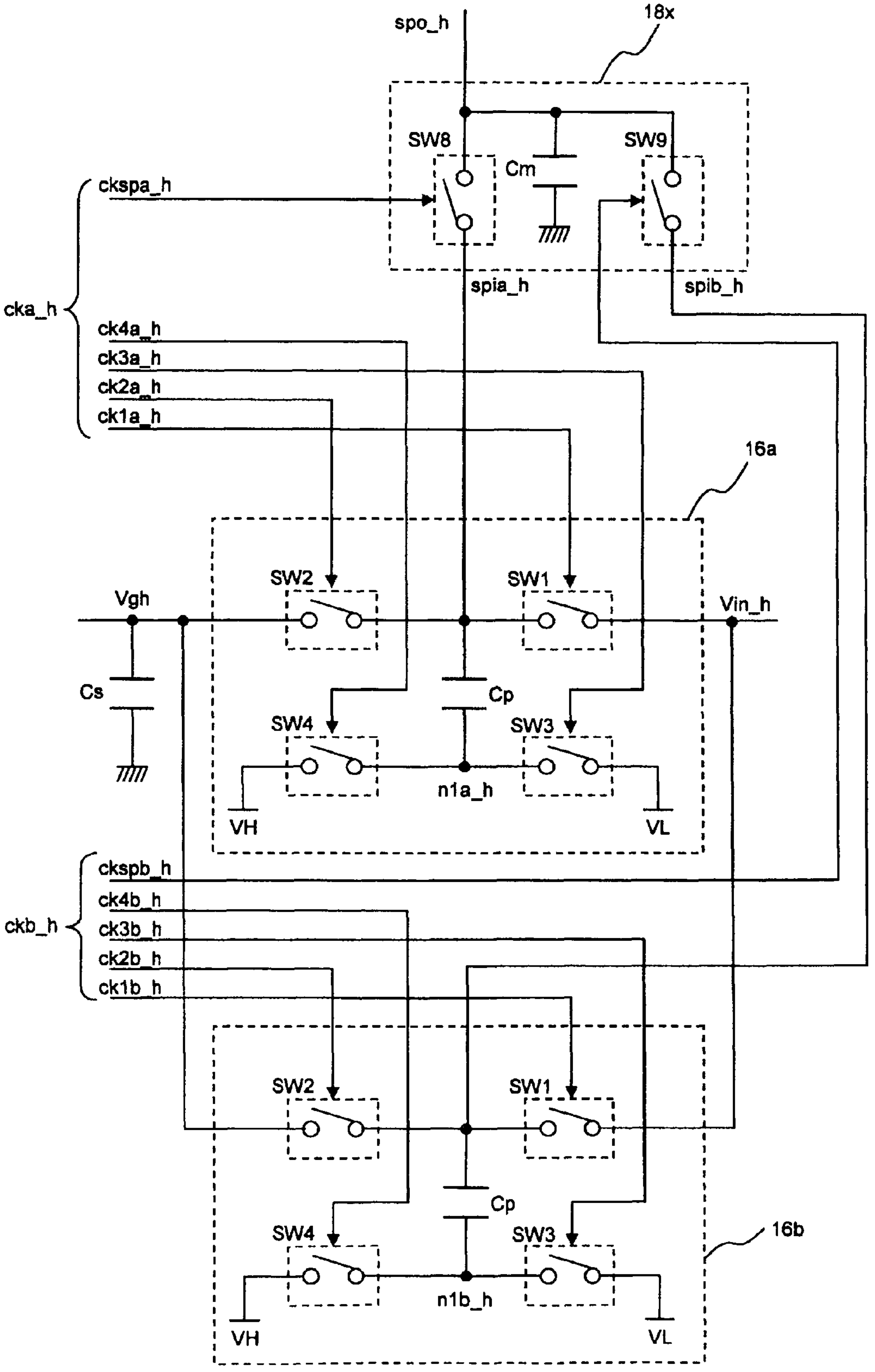
FIG. 11 is a configuration diagram of a charge pump booster and a sampler according to a third embodiment of the present invention.

FIG. 11 is a schematic diagram showing a configuration of a charge pump booster and a sampler in the present embodiment. Hereafter, the configuration of the charge pump booster in the present embodiment will be described. Only a booster for Vgh will now be described as an example thereof.

The charge pump booster in the present embodiment has a dual configuration incorporating two charge pump boosters shown in FIG. 2. Therefore, output voltages Vgh of two charge pump boosters 16*a* and 16*b* are connected to the same stabilizing capacitance Cs. The boosting power supply voltage Vin_h is also common.

The boosting clock ck_h output from the boosting clock generator 7 includes signals cka_h for the booster 16*a* and signals ckb_h for the booster 16*b*. A sampler 18*x* includes a switch SW8, a switch SW9 and sampling capacitance Cm.

The switch SW8 is controlled by a boosting clock ckspa_h to sample a voltage spia_h at a first terminal of pumping capacitance Cp in the booster 16*a* onto Cm. The switch SW9 is controlled by a boosting clock ckspb_h to sample a voltage spib_h at a first terminal of pumping capacitance Cp in the booster 16*b* onto Cm.

The sampler 18*x* outputs a signal voltage stored across the sampling capacitance Cm, as an output monitoring signal spo_h.

Operation of the charge pump booster and the sampler 18*x* in the present embodiment will now be described with reference to FIG. 12. Since description of each of the charge pump boosters 16*a* and 16*b* overlaps description of the first embodiment, it will be omitted.

In each of boosters in the charge pump booster having a dual configuration in the present embodiment, a first time period required to supply power to the stabilizing capacitance Cs and the load by using the pumping capacitance Cp and a second time period for sampling information of power supplied during the first time period by using the boosting clock cksp are considered to be a sub-period. Sub-periods in the two boosters (16*a* and 16*b*) are set so as not to overlap each other in one period cyc_h.

Figure 12:
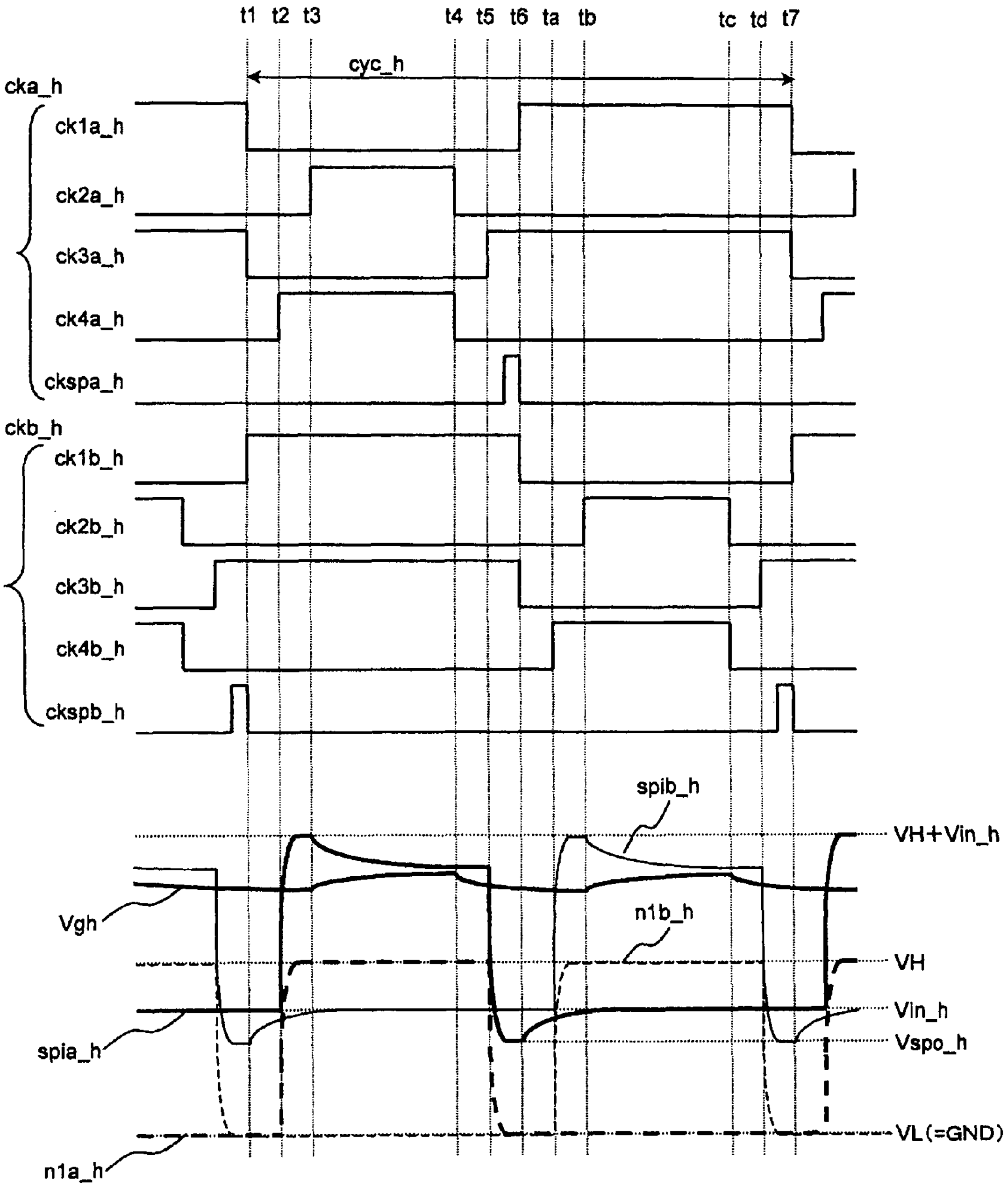
FIG. 12 is a timing chart and a voltage waveform diagram showing operation of a Vgh booster in a third embodiment of the present invention.

As shown in FIG. 12, the sub-period of the booster 16*a* corresponds to a first time period required to supply power to the stabilizing capacitance Cs and the load by using the pumping capacitance Cp i.e., a time period between time t2 and t4, and a second time period for sampling information of power supplied during the first time period by using the boosting clock ckspa_h, a time period between time t4 and t6. The sub-period of the booster 16*b* corresponds to a first time period required to supply power to the stabilizing capacitance Cs and the load by using the pumping capacitance Cp i.e., a time period between time ta and tc, and a second time period for sampling information of power supplied during the first time period by using the boosting clock ckspb_h, a time period between time tc and t7. The sub-periods do not overlap each other.

By thus setting the sub-periods so as not to cause overlapping, power can be supplied from the two boosters efficiently.

Even if the charge pump booster having a dual configuration is used as in the present embodiment, it is possible to extract the internal voltage of each booster which changes according to the output state of the load by sampling the internal voltage spi of each booster in the sampler 18*x*. Therefore, it becomes possible to exercise the output control of the booster in the same way as the first embodiment.

In this case, the method of adjusting the boosting power supply voltage Vin may be used, or the method of adjusting the boosting clock ck may be used as the control method. Or the method of adjusting both the boosting clock ck and the boosting power supply voltage Vin may be used.

With reference to FIG. 12, only the case of the voltage doubling boosting has been described. In the case of the inversion boosting as well, however, it is possible to use a dual configuration and control the output in the same way as the present embodiment.

In the present embodiment, the charge pump booster shown in FIG. 2 has been described supposing it to have a dual configuration. Even if the charge pump booster according to the second embodiment shown in FIGS. 8A-8C is formed to have a dual configuration, its output can be controlled in the same way as the present embodiment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display device comprising:

a first voltage generation circuit comprising a first voltage circuit for outputting an internal voltage on the basis of a plurality of clocks, a first sampling circuit for sampling an output signal from the first voltage circuit, a first monitoring circuit for comparing an output signal from the first sampling circuit with a predetermined voltage range and outputting a result, and a power supply generation circuit for generating a power supply voltage to be input to the first voltage circuit on the basis of an output signal supplied from the first monitoring circuit; and a second voltage generation circuit comprising a second voltage circuit for outputting an internal voltage on the basis of a plurality of clocks, a second sampling circuit for sampling an output signal from the second voltage circuit, a second monitoring circuit for comparing an output signal from the second sampling circuit with a predetermined voltage range and outputting a result, and a clock generation circuit for generating the clocks to be input to the second voltage circuit on the basis of an output signal supplied from the second monitoring circuit, wherein the first voltage circuit is controlled on the basis of a level of the power supply voltage, and the second voltage circuit is controlled on the basis of periods of the clocks.

2. The display device according to claim 1, wherein a clock generation circuit is disposed instead of the power supply generation circuit in said first voltage generation circuit, or a power supply generation circuit is disposed instead of the clock generation circuit in said second voltage generation circuit, the first voltage circuit is controlled on the basis of the level of the power supply voltage or the periods of the clocks, and the second voltage circuit is controlled on the basis of the periods of the clocks or the level of the power supply voltage.

3. A display device comprising:

a boosting circuit comprising a first switch, a second switch, a third switch, a fourth switch and a pumping capacitance;

a sampling circuit comprising a fifth switch and a sampling capacitance and for sampling a voltage signal at a first terminal of the pumping capacitance during a time period determined by a fifth input signal; and a monitoring circuit for comparing an output signal from said sampling circuit with a predetermined voltage range, wherein a first input voltage is input to a first terminal of the first switch, a second terminal of the first switch is connected to the first terminal of the pumping capacitance, a first terminal of the second switch, and a first terminal of the fifth switch, a second input voltage is input to a first terminal of the third switch, and a second terminal of the third switch is connected to a second terminal of the pumping capacitance and a first terminal of the fourth switch, a third input voltage is input to a second terminal of the fourth switch, a second terminal of the second switch forms an output terminal of said boosting circuit, a second terminal of the fifth switch is connected to a first terminal of the sampling capacitance and the monitoring circuit, the first switch is controlled to assume an on-state or an off-state by a first input signal, the second switch is controlled to assume an on-state or an off-state by a second input signal, the third switch is controlled to assume an on-state or an off-state by a third input signal, the fourth switch is controlled to assume an on-state or an off-state by a fourth input signal, and the fifth switch is controlled to assume an on-state or an off-state by a fifth input signal.

4. The display device according to claim 3, wherein the sampling in said sampling circuit is conducted before the first input signal turns on.

5. The display device according to claim 3, further comprising a clock generation circuit for controlling periods of the first to fifth input signals.

6. The display device according to claim 3, further comprising a power supply generation circuit for controlling a voltage level of the first input voltage.

7. The display device according to claim 5, wherein the third switch comprises an n-type thin film transistor, each of the first switch, the second switch and the fourth switch comprises a p-type thin film transistor, the first input voltage and the third input voltage are higher in potential than the second input voltage, a first time period and a second time period are repeated, over the first time period, the first and third switches are in an on-state based on the first and third input signals, the second and fourth switches are in an off-state based on the second and fourth input signals, and consequently the pumping capacitance retains a voltage corresponding to a potential difference between the first and second input voltages, over the second time period, the first and third switches are in an off-state based on the first and third input signals, the second and fourth switches are in an on-state based on the second and fourth input signals, and consequently a potential at a second terminal of the pumping capacitance becomes the third input voltage and a potential at a first terminal of the pumping capacitance rises, and during a time period between end of the second time period and start of the first time period, the third switch is turned on based on the third input signal and said sampling circuit samples the voltage signal at the first terminal of the pumping capacitance.

8. A display device comprising:

a boosting circuit comprising a first switch, a second switch and pumping capacitance;

a sampling circuit comprising a third switch and a sampling capacitance, and for sampling a voltage signal at a first terminal of the pumping capacitance during a time period determined by a fourth input signal; and a monitoring circuit for comparing an output signal from said sampling circuit with a predetermined voltage range, wherein a first input voltage is input to a first terminal of the first switch, a second terminal of the first switch is directly connected to the first terminal of the pumping capacitance, a first terminal of the second switch, and a first terminal of the third switch, a second terminal of the second switch forms an output terminal of said boosting circuit, a second terminal of the third switch is connected to a first terminal of the sampling capacitance and the monitoring circuit, the first switch is controlled to assume an on-state or an off-state by a first input signal, the second switch is controlled to assume an on-state or an off-state by a second input signal, a second terminal of the pumping capacitance is connected to a third input signal, and the third switch is controlled to assume an on-state or an off-state by a third input signal.

9. The display device according to claim 8, wherein the sampling in said sampling circuit is conducted before the first input signal turns on.

10. The display device according to claim 8, further comprising a clock generation circuit for controlling periods of the first to fourth input signals.

11. The display device according to claim 8, further comprising a power supply generation circuit for controlling a voltage level of the first input voltage.

12. The display device according to claim 10, wherein each of the switches comprise a plurality of thin film transistors of same conductivity type, a first terminal and a gate terminal of a first thin film transistor are connected to a first terminal of a second thin film transistor and a first terminal of a third thin film transistor to form a first terminal of the switch, a second terminal of the first thin film transistor is connected to a second terminal of the second thin film transistor, a gate terminal of a third thin film transistor, and a first terminal of capacitance, a second terminal of the capacitance is connected to a terminal of an input signal for controlling the on-state and off-state, and a second terminal of the third thin film transistor is connected to a gate terminal of the second thin film transistor to form a second terminal of the switch, a first time period and a second time period are repeated, over the first time period, the first input signal is high in potential and the second and third input signals are low in potential, and consequently the pumping capacitance retains a voltage corresponding to a potential difference between the first input voltage and the third input signal, over the second time period, the second and third input signals are high in potential and the first input signal is low in potential, and consequently a potential at the first terminal of the pumping capacitance is raised by an amplitude of the third input signal, and during a time period between end of the second time period and start of the first time period, said sampling circuit samples the voltage signal at the first terminal of the pumping capacitance when the first to third input signals are in a low voltage state.

13. The display device according to claim 10, wherein each of the switches comprise a plurality of thin film transistors of same conductivity type, a first terminal and a gate terminal of a first thin film transistor are connected to a first terminal of a second thin film transistor and a first terminal of a third thin film transistor to fore second terminal of the switch, a second terminal of the first thin film transistor is connected to a second terminal of the second thin film transistor, a gate terminal of a third thin film transistor, and a first terminal of capacitance, a second terminal of the capacitance is connected to a terminal of an input signal for controlling the on-state and off-state, and a second terminal of the third thin film transistor is connected to a gate terminal of the second thin film transistor to form a first terminal of the switch, a first time period and a second time period are repeated, over the first time period, the second input signal is low in potential and the first and third input signals are high in potential, and consequently the pumping capacitance retains a voltage corresponding to a potential difference between the first input voltage and the third input signal, over the second time period, the first and third input signals are low in potential and the second input signal is high in potential, and consequently a potential at the first terminal of the pumping capacitance is lowered by an amplitude of the third input signal, and during a time period between end of the second time period and start of the first time period, said sampling circuit samples the voltage signal at the first terminal of the pumping capacitance when the first and second input signals are in a low voltage state and the third input signal is in a high voltage state.

14. A display device comprising:

a plurality of boosting circuits, each boosting circuit comprising a first switch, a second switch, a third switch, a fourth switch and a pumping capacitance, and each boosting circuit being able to be controlled by a first input signal for controlling an on-state or an off-state of said first switch, a second input signal for controlling an on-state or an off-state of said second switch, a third input signal for controlling an on-state or an off-state of said third switch, a fourth input signal for controlling an on-state or an off-state of said fourth switch and a fifth input signal used for sampling a voltage signal of a first terminal of said pumping capacitance at a predetermined interval, wherein a first terminal of said first switch in said plurality of boosting circuits is input with a first input voltage, a first terminal of said third switch in said plurality of boosting circuits is input with a second input voltage, a second terminal of said fourth switch in said plurality of boosting circuits is input with a third input voltage, a second terminal of said second switch in said plurality of boosting circuits configures an output terminal of said plurality of boosting circuits, a second terminal of said first switch is connected to a first terminal of said pumping capacitance and a first terminal of said second switch of said boosting circuits, and a second terminal of said third switch is connected to a second terminal of said pumping capacitance and a first terminal of said fourth switch of said boosting circuits, a sampling circuit for sampling a voltage signal of said first terminal of said pumping capacitance of said boosting circuits at a predetermined interval determined by said fifth input signal; and a monitoring circuit for comparing an output signal from said sampling circuit with a predetermined voltage range and outputting a result of the comparison.

15. The display device according to claim 7, wherein the n-type thin film transistor and the p-type thin film transistor are formed using polycrystalline silicon as a semiconductor layer.

16. The display device according to claim 5, wherein the fourth switch comprises an n-type thin film transistor, each of the first switch, the second switch and the third switch comprises a p-type thin film transistor, the first input voltage and the third input voltage are lower in potential than the second input voltage, a first time period and a second time period are repeated, over the first time period, the first and third switches are in an on-state based on the first and third input signals, the second and fourth switches are in an off-state based on the second and fourth input signals, and consequently the pumping capacitance retains a voltage corresponding to a potential difference between the first and second input voltages, over the second time period, the first and third switches are in an off-state based on the first and third input signals, the second and fourth switches are in an on-state based on the second and fourth input signals, and consequently a potential at a second terminal of the pumping capacitance becomes the third input voltage and a potential at a first terminal of the pumping capacitance falls, and during a time period between end of the second time period and start of the first time period, the third switch is turned on based on the third input signal and said sampling circuit samples the voltage signal at the first terminal of the pumping capacitance.

* * * * *